(12) United States Patent
Kawaguchi et al.

(10) Patent No.: US 8,864,891 B2
(45) Date of Patent: Oct. 21, 2014

(54) INK COMPOSITION, INKJET RECORDING METHOD AND COLORED BODY

(75) Inventors: Akira Kawaguchi, Tokyo (JP); Takashi Yoshimoto, Tokyo (JP); Kenji Ooshima, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/994,367

(22) PCT Filed: Dec. 14, 2011

(86) PCT No.: PCT/JP2011/078956
§ 371 (c)(1),
(2), (4) Date: Jun. 14, 2013

(87) PCT Pub. No.: WO2012/081638
PCT Pub. Date: Jun. 21, 2012

(65) Prior Publication Data
US 2013/0257974 A1    Oct. 3, 2013

(30) Foreign Application Priority Data

Dec. 17, 2010    (JP) .................................. 2010-281299

(51) Int. Cl.
*C09D 11/02*    (2014.01)
(Continued)

(52) U.S. Cl.
CPC .............. *C09D 11/328* (2013.01); *C09B 33/28* (2013.01); *B42D 15/00* (2013.01); *C09B 43/16* (2013.01); *C09D 11/324* (2013.01); *C09B 31/30* (2013.01); *C09B 67/0046* (2013.01); *C09B 67/0055* (2013.01)
USPC ...................................... 106/31.48; 106/31.5

(58) Field of Classification Search
USPC ................ 106/31.5, 31.48; 347/100
See application file for complete search history.

(56) References Cited

U.S. PATENT DOCUMENTS 5,447,819 A *    9/1995  Mooberry et al. ............ 430/226
7,217,803 B2      5/2007  Feiler et al.
(Continued)

FOREIGN PATENT DOCUMENTS

DE    2004488 A    8/1971
JP    3383469 B    12/2002
(Continued)

OTHER PUBLICATIONS

Office Action issued to U.S. Appl. No. 13/993,599, mailed Jul. 2, 2014.

*Primary Examiner* — Helene Klemanski
(74) *Attorney, Agent, or Firm* — Knobbe Martens Olson & Bear LLP

(57) ABSTRACT

An aqueous black ink composition that produces a black recorded image that is stable even when stored for a long time period, exhibits a neutral black to gray color with low color saturation and no tinge, has a high printed image density and exhibits excellent fastness properties of the recorded image, particularly ozone-gas resistance. The ink composition contain at least one kind of coloring matter (I), which a coloring matter represented by formula (1) below, a tautomer thereof, or a salt of the coloring matter or the tautomer; at least one kind of coloring matter (II), which is a coloring matter represented by formula (2) below or a salt thereof; and coloring matter (III), which is a coloring matter having an azo group other than coloring matters (I) and (II), or a salt thereof.

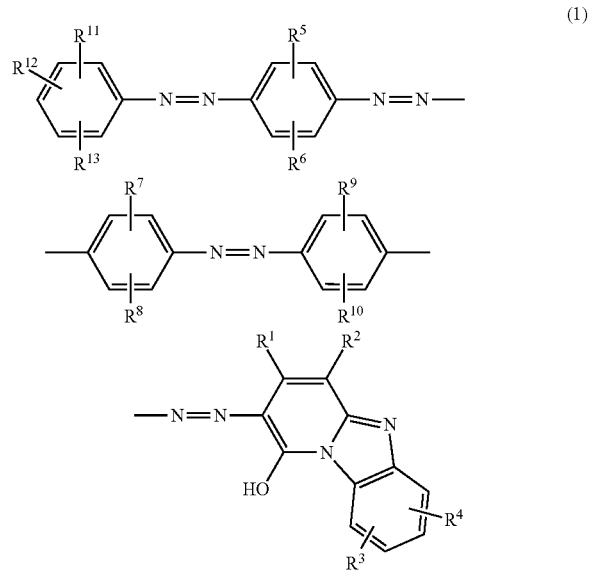

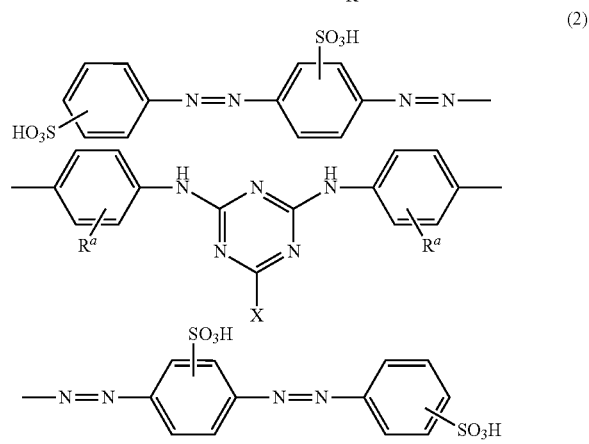

15 Claims, No Drawings

(51) Int. Cl.
   *C09D 11/328* (2014.01)
   *C09B 33/28* (2006.01)
   *B42D 15/00* (2006.01)
   *C09B 43/16* (2006.01)
   *C09D 11/324* (2014.01)
   *C09B 31/30* (2006.01)
   *C09B 67/22* (2006.01)

(56) References Cited

U.S. PATENT DOCUMENTS

| | | | |
|---|---|---|---|
| 7,326,288 B2 | 2/2008 | Matsui et al. | |
| 7,427,319 B2 * | 9/2008 | Yoneda et al. | 106/31.48 |
| 7,771,525 B2 * | 8/2010 | Morita et al. | 106/31.48 |
| 7,901,498 B2 | 3/2011 | Hirota et al. | |
| 8,080,100 B2 | 12/2011 | Yoshimoto et al. | |
| 8,167,991 B2 | 5/2012 | Matsui et al. | |
| 8,556,406 B2 * | 10/2013 | Yoshimoto et al. | 106/31.5 |
| 2009/0062545 A1 * | 3/2009 | Matsui et al. | 106/31.48 |
| 2013/0257974 A1 | 10/2013 | Kawaguchi et al. | |
| 2013/0321523 A1 * | 12/2013 | Yoshimoto et al. | 106/31.48 |
| 2013/0335490 A1 * | 12/2013 | Nagao et al. | 106/31.48 |

FOREIGN PATENT DOCUMENTS

| | | |
|---|---|---|
| JP | 2008-169374 A | 7/2008 |
| JP | 2009-185133 A | 8/2009 |
| JP | 2009-263513 A | 11/2009 |
| WO | WO 2006/001274 | 1/2006 |
| WO | WO 2007/077931 | 7/2007 |
| WO | WO 2008/053776 | 5/2008 |
| WO | WO 2012/081637 | 6/2012 |

* cited by examiner

INK COMPOSITION, INKJET RECORDING METHOD AND COLORED BODY

This application is the U.S. National Phase under 35 U.S.C. §371 of International Application PCT/JP2011/078956, filed Dec. 14, 2011, designating the U.S., and published in Japanese as WO 2012/081638 on Jun. 21, 2012, which claims priority to Japanese Patent Application No. 2010-281299, filed Dec. 17, 2010, the entire contents of which are incorporated herein by reference.

TECHNICAL FIELD

The present invention relates to an ink composition containing each of three kinds of particular coloring matters, namely, coloring matters (I), (II), and (III), an inkjet recording method using the ink composition, and a colored body colored by the ink composition.

BACKGROUND ART

A recording method using an inkjet printer, which is a representative method among various color recording methods, is intended to perform recording by generating small ink droplets and attaching the ink droplets to a variety of record-receiving materials (paper, film, cloth, and the like). In this method, since a recording head is not brought into direct contact with a record-receiving material, less noise is generated and silent recording is achieved. Furthermore, since this method has the feature that it is easy to reduce apparatus size and to increase process speed, the inkjet recording method has been rapidly popularized in recent years, and further growth in the future is expected as well.

Conventionally, aqueous inks prepared by dissolving water-soluble coloring matters in an aqueous medium have been used as inks for fountain pens, felt pens, and the like and as inks for inkjet recording. These aqueous inks generally have water-soluble organic solvents added thereto so that clogging of the ink at pen tips or ink discharge nozzles can be prevented. Further, in regard to these inks, it is required that recorded images with sufficient densities be provided, that clogging at pen tips or nozzles not occur, that the inks have satisfactory dryability on record-receiving materials, that less bleeding occur, that the inks have excellent storage stability, and the like. Furthermore, the water-soluble dyes used therein are required to have high solubility, particularly in water, and to have high solubility in water-soluble organic solvents that are added to the inks. Moreover, the images thus formed are required to have image-fastness properties such as water resistance, light resistance, gas resistance, and moisture resistance.

Among these, gas resistance means resistance to a phenomenon of causing discoloration and fading of a redorded image via an action of ozone gas or the like present in the air and having an oxidizing action on a coloring matter in the record-receiving material. In addition to ozone gas, examples of oxidizing gases having this kind of action include NOx and SOx; however, among these oxidizing gases, ozone gas is regarded as the main causative substance that accelerates the phenomenon of discoloration and fading of inkjet-recorded images. Therefore, resistance to ozone gas in particular tends to be considered the most important. At the surface of a paper for inkjet exclusive use capable of giving photographic-image quality, an ink-receiving layer is provided in order to speed up drying of the ink and to reduce bleeding at high image quality. Regarding the material of this ink-receiving layer, materials such as porous white inorganic substances are frequently used. On such a recording paper, discoloration and fading caused by ozone gas is notably observed. Since this phenomenon of discoloration and fading caused by an oxidizing gas is characteristic of inkjet images, enhancement of ozone-gas resistance is one of the most important problems to be solved in the field of inkjet recording method.

In order to extend the field of application of printing methods using inks in the future, there is strong demand for further enhancements of light resistance, gas resistance, moisture resistance, water resistance, and the like in the ink compositions used in inkjet recording and colored bodies colored by ink compositions.

Inks of various hues have been prepared from various coloring matters, but among them black ink is an important ink that is used in both monochromatic images and full-color images. However, development of a coloring matter that exhibits satisfactory black color, with a hue for which the deep color region and the light color region are neutral, and that has a high print density and lower light source dependency of the hue is technically very difficult. Although tremendous research and development is under way, there are still few coloring matters that exhibit sufficient performance. Accordingly, it has been a general practice to prepare black inks by incorporating a plural number of various coloring matters. However, when an ink is prepared by mixing plural coloring matters, there is a problem in that: 1) the hues may vary depending on the medium (record-receiving material); and 2) discoloration in particular may become significant as a result of the decomposition of coloring matters caused by light or ozone gas, as compared with the case of preparing an ink with a single coloring matter.

An example of a black ink composition for inkjet recording that gives a print material with satisfactory durability in various aspects may be the ink of Patent Document 1. Furthermore, Patent Document 2 has suggested an ink which has further improved ozone resistance and has a satisfactory hue as black color. However, although these inks are ink compositions that have achieved significant improvements even in view of the image-fastness properties of the print materials, there is still demand for further improvement of ozone-gas resistance in particular, and products that sufficiently fulfill market demands are yet to be provided.

Patent Document 1: PCT International Publication No. WO2007/077931
Patent Document 2: Japanese Unexamined Patent Application, Publication No. 2009-185133
Patent Document 3: PCT International Publication No. WO2006/001274
Patent Document 4: PCT International Publication No. WO2008/053776
Patent Document 5: Japanese Patent Publication No.
Patent Document 6: German Patent Application, No. 2004488, Specification

DISCLOSURE OF THE INVENTION

Problems to be Solved by the Invention

An object of the present invention is to provide an aqueous black ink composition capable of producing a black recorded image that is stable even when stored for a long time period, exhibits a neutral black to gray color with low color saturation and with no tinge, exhibits high density of printed images, and is excellent in various fastness properties, particularly the ozone-gas resistance, of the recorded image.

Means for Solving the Problems

The inventors of the present invention conducted thorough investigations in order to solve problems such as those described above, and as a result, the inventors found that an ink composition containing at least one kind each of a particular coloring matter represented by the formula (1), a tautomer thereof, or a salt of the coloring matter or the tautomer (coloring matter (I)); a coloring matter represented by the formula (2) or a salt thereof (coloring matter (II)); and a coloring matter other than coloring matters (I) and (II), or a salt thereof (coloring matter (III)), can solve the problems described above. Thus, the inventors completed the present invention.

Accordingly, a first aspect of the present invention provides an ink composition containing at least one kind of coloring matter (I), which is a coloring matter represented by the following formula (1), a tautomer thereof, or a salt of the coloring matter or the tautomer; at least one kind of coloring matter (II), which is a coloring matter represented by the following formula (2), or a salt thereof; and coloring matter (III), which is a coloring matter having an azo group other than coloring matters (I) and (II), or a salt thereof:

$R^8$ represents a (C1-C4) alkylcarbonylamino group, $R^9$ and $R^{10}$ each independently represent a hydrogen atom; a carboxy group; a sulfo group; an acetylamino group; a chlorine atom; a (C1-C4) alkyl group; a (C1-C4) alkoxy group; or a (C1-C4) alkoxy group substituted with at least one kind of group selected from the group consisting of a hydroxy group, a (C1-C4) alkoxy group, a sulfo group, and a carboxy group, and $R^{11}$ to $R^{13}$ each independently represent a hydrogen atom; a carboxy group; a sulfo group; a hydroxy group; an acetylamino group; a chlorine atom; a cyano group; a nitro group; a sulfamoyl group; a (C1-C4) alkyl group; a (C1-C4) alkoxy group; a (C1-C4) alkoxy group substituted with at least one kind of group selected from the group consisting of a hydroxy group, a (C1-C4) alkoxy group, a sulfo group, and a carboxy

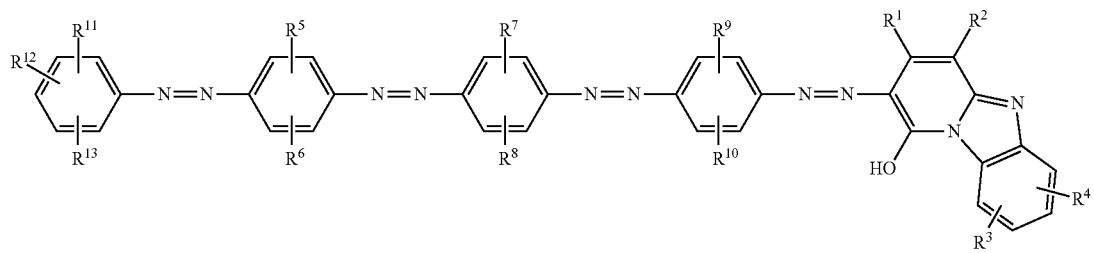

(1)

in the formula (1), $R^1$ represents a (C1-C4) alkyl group; a (C1-C4) alkyl group substituted with a carboxy group; a phenyl group; a phenyl group substituted with a sulfo group; or a carboxy group, group; a (C1-C4) alkylsulfonyl group; or a (C1-C4) alkylsulfonyl group substituted with at least one kind of group selected from the group consisting of a hydroxy group, a sulfo group, and a carboxy group,

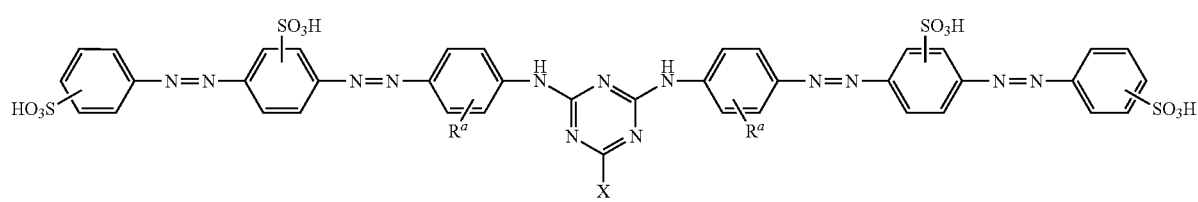

(2)

$R^2$ represents a cyano group; a carbamoyl group; or a carboxy group, $R^3$ and $R^4$ each independently represent a hydrogen atom; a (C1-C4) alkyl group; a halogen atom; a (C1-C4) alkoxy group; or a sulfo group, $R^5$ represents a (C1-C4) alkylthio group; or a (C1-C4) alkylthio group substituted with at least one kind of group selected from the group consisting of a hydroxy group, a sulfo group, and a carboxy group, $R^6$ represents a (C1-C4) alkylcarbonylamino group, $R^7$ represents a (C1-C4) alkylthio group; or a (C1-C4) alkylthio group substituted with at least one kind of group selected from the group consisting of a hydroxy group, a sulfo group, and a carboxy group, in the formula (2), $R^a$ represents a hydrogen atom; a hydroxy group; a carboxy group; an unsubstituted (C1-C4) alkyl group; a (C1-C4) alkyl group substituted with a hydroxy group or a (C1-C4) alkoxy group; an unsubstituted (C1-C4) alkoxy group; a (C1-C4) alkoxy group substituted with a hydroxy group or a (C1-C4) alkoxy group; an unsubstituted (C1-C4) alkylamino group; a (C1-C4) alkylamino group substituted with a hydroxy group or a (C1-C4) alkoxy group; a carboxy-(C1-C5) alkylamino group; a bis(carboxy-(C1-C5) alkyl)amino group; an unsubstituted (C1-C4) alkanoylamino group; a (C1-C4) alkanoylamino group substituted with a hydroxy group or a (C1-C4) alkoxy group; an unsubstituted phenylamino group; a phenylamino group having the benzene ring substituted with at least one kind of group selected from the group consisting of a carboxy group, a sulfo group, and an amino group; a sulfo group; a halogen atom; or a ureido group, and X represents an aliphatic amino group substituted with a carboxy group or a sulfo group.

A second aspect of the present invention provides the ink composition according to the first aspect, wherein in the formula (1),
$R^1$ represents a methyl group; or a phenyl group,
$R^2$ represents a cyano group; or a carbamoyl group,
$R^3$ represents a hydrogen atom; a methyl group; or a methoxy group,
$R^4$ represents a sulfo group,
$R^5$ represents a (C1-C4) alkylthio group substituted with a sulfo group or a carboxy group,
$R^6$ represents a (C1-C4) alkylcarbonylamino group,
$R^7$ represents a (C1-C4) alkylthio group substituted with a sulfo group or a carboxy group,
$R^8$ represents a (C1-C4) alkylcarbonylamino group,
$R^9$ represents a sulfo-(C1-C4) alkoxy group,
$R^{10}$ represents a (C1-C4) alkyl group; or an acetylamino group, and
$R^{11}$ to $R^{13}$ each independently represent a hydrogen atom; a carboxy group; a sulfo group; a chlorine atom; a nitro group; a methyl group; a methoxy group; a sulfamoyl group; or a (C1-C4) alkylsulfonyl group substituted with a sulfo group or a carboxy group.

A third aspect of the present invention provides the ink composition according to the first aspect, wherein in the formula (1),
$R^1$ represents a methyl group,
$R^2$ represents a cyano group or a carbamoyl group,
$R^3$ represents a hydrogen atom; a methyl group; or a methoxy group,
$R^4$ represents a sulfo group,
$R^5$ represents a sulfo-(C1-C4) alkylthio group,
$R^6$ represents a (C1-C4) alkylcarbonylamino group,
$R^7$ represents a sulfo-(C1-C4) alkylthio group,
$R^8$ represents a (C1-C4) alkylcarbonylamino group,
$R^9$ represents a sulfo-(C1-C4) alkoxy group,
$R^{10}$ represents a (C1-C4) alkyl group; or an acetylamino group, and
$R^{11}$ to $R^{13}$ each independently represent a hydrogen atom; a carboxy group; a sulfo group; a chlorine atom; a nitro group; a methyl group; a methoxy group; or a sulfamoyl group.

A fourth aspect of the present invention provides the ink composition according to any of the first to third aspects, wherein the coloring matter represented by the formula (2) is represented by the following formula (3):

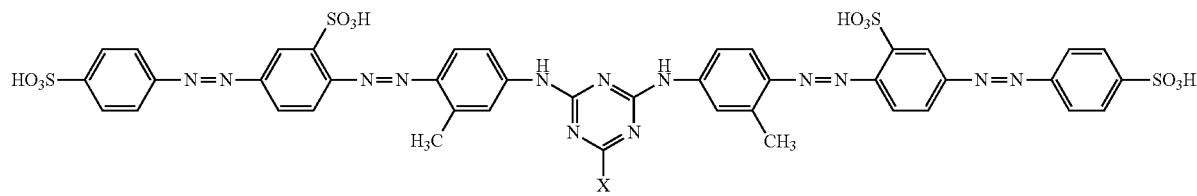

(3)

in the formula (3), X has the same meaning as defined in the formula (2).

A fifth aspect of the present invention provides the ink composition according to any of the first to fourth aspects, wherein X represents a mono(C1-C5) alkylamino group or di(C1-C5) alkylamino group having a carboxy group or a sulfo group.

A sixth aspect of the present invention provides the ink composition according to any of the first to fourth aspects, wherein X represents a sulfoethylamino group.

A seventh aspect of the present invention provides the ink composition according to any of the first to sixth aspects, wherein the coloring matter (III) is a water-soluble yellow dye having one or two azo groups in one molecule.

An eighth aspect of the present invention provides the ink composition according to any of the first to seventh aspects, wherein relative to the total mass of the coloring matters contained in the ink composition, the ratio of the coloring matter (I) is 50% to 90% by mass, the ratio of the coloring matter (II) is 3% to 30% by mass, and the ratio of the coloring matter (III) is 3% to 30% by mass.

A ninth aspect of the present invention provides the ink composition according to any of the first to eighth aspects, wherein the total content of the coloring matter (I), the coloring matter (II) and the coloring matter (III) is 0.1% to 20% by mass relative to the total mass of the ink composition.

A tenth aspect of the present invention provides the ink composition according to any of the first to ninth aspects, which is utilizing in inkjet recording.

A eleventh aspect of the present invention provides an inkjet recording method including: utilizing the ink composition according to any of the first to tenth aspects as an ink, discharging ink droplets of the ink according to recording signals, and thereby performing recording on a record-receiving material.

A twelfth aspect of the present invention provides the inkjet recording method according to the eleventh aspect, wherein the record-receiving material is a communication sheet.

A thirteenth aspect of the present invention provides the inkjet recording method according to the twelvth aspect, wherein the communication sheet is a sheet having an ink-receiving layer containing a porous white inorganic substance.

A fourteenth aspect of the present invention provides a colored body colored with the ink composition according to any of the first to tenth aspects.

A fifteenth aspect of the present invention provides an inkjet printer equipped with a vessel containing the ink composition according to any of the first to tenth aspects.

Effects of the Invention

The ink composition of the present invention does not exhibit crystal precipitation after long-term storage, a change in properties, a change in color, or the like, and has satisfactory storage stability. Furthermore, when recording is performed on a paper for inkjet exclusive use by using the ink composition of the present invention as an ink, a black printed matter that is achromatic with low color saturation and has a deep black color can be obtained. Also, the ink composition has a high print density and is excellent in various fastness properties such as light resistance, moisture resistance, and water resistance, and particularly in ozone-gas resistance. As such, the ink composition of the present invention is highly useful as a black ink for inkjet recording.

PREFERRED MODE FOR CARRYING OUT THE INVENTION

Hereinafter, the present invention will be described in detail.

Meanwhile, unless particularly stated otherwise in the present invention, acidic functional groups such as a sulfo group and a carboxy group are indicated in the form of free acids.

Furthermore, an expression such as "coloring matter, a tautomer thereof, or a salt of the coloring matter or the tautomer" may be briefly described as "coloring matter" for convenience, in order to avoid complicated description; however, even in that case, the expression is intended to mean any of the coloring matter, the tautomer thereof, the salt of the coloring matter or the tautomer, or the mixture thereof.

Similarly, an expression such as "coloring matter or a salt thereof" may be briefly described as "coloring matter" for convenience, in order to avoid complicated description; however, even in that case, the expression is intended to mean any of the coloring matter, the salt thereof, or the mixture thereof.

The ink composition of the present invention is an aqueous black ink composition containing at least one kind of the coloring matter (I) represented by the formula (1), at least one kind of the coloring matter (II) represented by the formula (2), and the coloring matter (III).

As will be described below, the ink composition of the present invention may further contain a coloring matter other than the coloring matter (I), the coloring matter (II), and the coloring matter (III), for the purpose of preparing a neutral, high-quality black color. However, in conventional cases, the ink composition of the present invention can give the effect of the present invention even if the ink composition does not contain a coloring matter other than the coloring matter (I), the coloring matter (II), and the coloring matter (III).

The coloring matter (I) contained in the ink composition of the present invention is one or more kinds of the coloring matter represented by the formula (1). That is, the coloring matter (I) may be a single coloring matter represented by the formula (1); however, from the viewpoints of ease of production, low price, and the like, the coloring matter (I) is usually desirably a mixed coloring matter including numerous kinds of the tetrakisazo compound represented by the formula (1), and roughly speaking, preferably 1 to 8 kinds, more preferably 1 to 7 kinds, and even more preferably 2 to 6 kinds, of the tetrakisazo compound. In addition, even with such a mixed coloring matter, there is no hindrance to the effect obtainable by the present invention.

The azo compound represented by the formula (1) has tautomers. Regarding these tautomers, compounds represented by the following formulas (4) and (5) and the like may be considered, in addition to the compound represented by the formula (1). These compounds are also included in the present invention. Meanwhile, in the formulas (4) and (5), $R^1$ to $R^{13}$ respectively have the same meanings as defined in the formula (1).

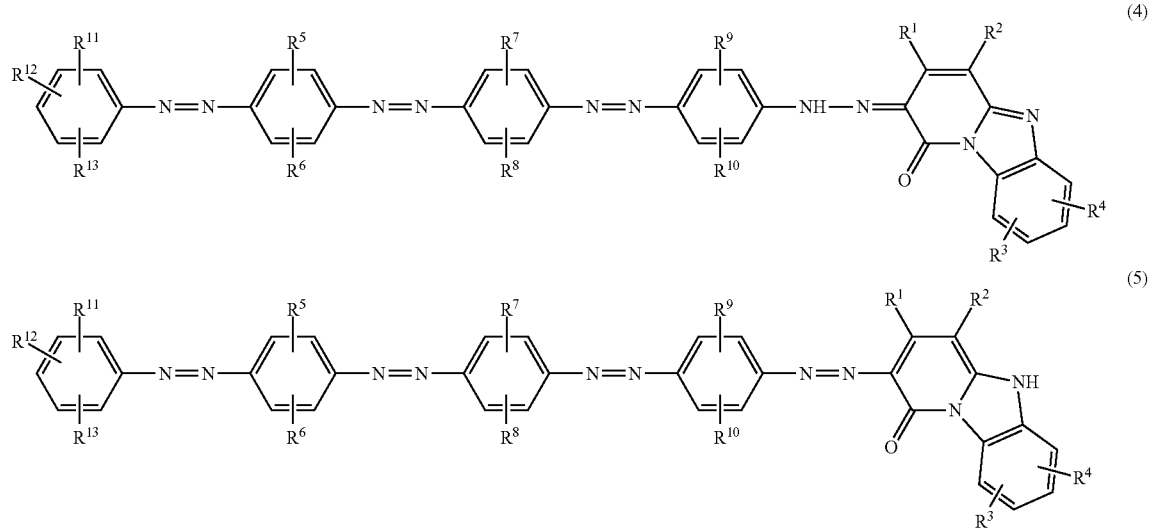

In the formula (1), the (C1-C4) alkyl group for $R^1$ may be an unsubstituted, linear, or branched alkyl group, and a linear alkyl group is preferred. Specific examples thereof include linear groups such as methyl, ethyl, n-propyl, and n-butyl; and branched groups such as isopropyl, isobutyl, sec-butyl, and tert-butyl. Preferred specific examples include methyl and n-propyl, and methyl is particularly preferred.

The (C1-C4) alkyl group substituted with a carboxy group for $R^1$ may be an unsubstituted (C1-C4) alkyl described above having any of the carbon atoms substituted by a carboxy group. There are no particular limitations on the substitution position of the carboxy group, but it is preferable that the carboxy group be substituted at an end of the alkyl group, and that the substitution number of the carboxy group be 1 or 2, and preferably 1. Specific examples thereof include carboxymethyl and 2-carboxyethyl. Preferred specific examples include carboxymethyl.

The phenyl group substituted with a sulfo group for $R^1$ may be a phenyl group substituted with one or three, and preferably one or two, sulfo groups, and there are no particular limitations on the substitution position of the sulfo group. Specific examples thereof include 3-sulfophenyl, 4-sulfophenyl, 2,4-disulfophenyl, and 3,5-disulfophenyl. Preferred specific examples include 4-sulfophenyl.

Preferred examples of $R^1$ include a (C1-C4) alkyl group, a (C1-C4) alkyl group substituted with a carboxy group, a phenyl group, and a phenyl group substituted with a sulfo group.

More preferred examples include a (C1-C4) alkyl group, a phenyl group, and a phenyl group substituted with a sulfo group.

Even more preferred examples include a (C1-C4) alkyl group and a phenyl group.

Particularly preferred examples include a (C1-C4) alkyl group, and among others, methyl is most preferred.

In the formula (1), $R^2$ represents a cyano group; a carbamoyl group; or a carboxy group. Among these, the cyano group and the carbamoyl group are preferred, and the cyano group is more preferred.

In the formula (1), examples of the (C1-C4) alkyl group for $R^3$ and $R^4$ include the same groups as those mentioned with regard to the (C1-C4) alkyl group for $R^1$, including preferred examples of the group.

The halogen atom for $R^3$ and $R^4$ may be a fluorine atom, a chlorine atom, a bromine atom, or an iodine atom, and a chlorine atom is preferred.

The (C1-C4) alkoxy group for $R^3$ and $R^4$ may be an unsubstituted, linear, or branched alkoxy group, and a linear alkoxy group is preferred. Specific examples thereof include linear groups such as methoxy, ethoxy, n-propoxy, and n-butoxy; and branched groups such as isopropoxy, isobutoxy, sec-butoxy, and tert-butoxy. Among these, methoxy is particularly preferred.

$R^3$ and $R^4$ are each independently preferably a hydrogen atom, a (C1-C4) alkyl group, a (C1-C4) alkoxy group, or a sulfo group.

More preferred is a combination in which any one of them is a hydrogen atom and the other is a sulfo group.

There are no particular limitations on the substitution positions of $R^3$ and $R^4$; however, it is preferable that when any one of them is a hydrogen atom and the other is a sulfo group, the sulfo group be substituted at any of the two carbon atoms that constitute the benzimidazolopyridone ring but that are not adjacent to any of the nitrogen atoms.

In regard to the compound represented by the formula (1) of the present invention, from the viewpoints of ease of synthesis and cheapness, the compound may be used as a mixture including at least two kinds of regioisomers in connection with the substitution positions of $R^3$ and $R^4$.

A preferred example of the combination of $R^1$ to $R^4$ in the formula (1) may be a combination in which $R^1$ is a (C1-C4) alkyl group or a phenyl group (preferably a (C1-C4) alkyl group, and more preferably a methyl group); $R^2$ is a cyano group or a carbamoyl group (preferably a cyano group); $R^3$ is a hydrogen atom, a methyl group, or a methoxy group (preferably a methoxy group); and $R^4$ is a sulfo group.

In the formula (1), the (C1-C4) alkylthio group for $R^5$ may be an unsubstituted alkylthio group with a linear or branched alkyl moiety, and a linear alkyl moiety is preferred. Specific examples thereof include linear groups such as methylthio, ethylthio, n-propylthio, and n-butylthio; and branched groups such as isopropylthio, isobutylthio, sec-butylthio, and tert-butylthio.

The (C1-C4) alkylthio group substituted with at least one kind of group selected from the group consisting of a hydroxy group, a sulfo group, and a carboxy group, which is for $R^5$, may be a (C1-C4) alkylthio group having these substituents on any of the carbon atoms. The number of the relevant substituents is usually 1 or 2, and preferably 1. There are no particular limitations on the position of the substituent, but it is preferable to substitute a carbon atom other than the carbon atom to which the sulfur atom in the alkylthio group is bonded.

Specific examples thereof include hydroxy-(C1-C4) alkylthio groups such as 2-hydroxyethylthio, 2-hydroxypropylthio, and 3-hydroxypropylthio; sulfo-(C1-C4) alkylthio groups such as 2-sulfoethylthio and 3-sulfopropylthio; and carboxy-(C1-C4) alkylthio groups such as 2-carboxyethylthio, 3-carboxypropylthio, and 4-carboxybutylthio.

Among those described above, $R^5$ is preferably a sulfo-(C1-C4) alkylthio group or a carboxy-(C1-C4) alkylthio group, and $R^5$ is more preferably a sulfo-(C1-C4) alkylthio group, and particularly preferably a sulfopropylthio group.

In the formula (1), the (C1-C4) alkylcarbonylamino group for $R^6$ may be an unsubstituted alkylcarbonylamino group having a linear or branched alkyl moiety, and a linear alkyl moiety is preferred. Specific examples thereof include linear groups such as acetylamino(methylcarbonylamino), propionylamino(ethylcarbonylamino), n-propylcarbonylamino, and n-butylcarbonylamino; and branched groups such as isopropylcarbonylamino, isobutylcarbonylamino, sec-butylcarbonylamino, and pivaloylamino(tert-butylcarbonylamino). Among these, linear groups are preferred, and an acetylamino group is particularly preferred.

A preferred combination of $R^5$ and $R^6$ is a combination in which $R^5$ is a sulfo-(C1-C4) alkylthio group and $R^6$ is an acetylamino group, and a combination in which $R^5$ is a sulfopropylthio group and $R^6$ is an acetylamino group is particularly preferred.

In the formula (1), the (C1-C4) alkylthio group for $R^7$ may be an unsubstituted alkylthio group with a linear or branched alkyl moiety, and a linear alkyl moiety is preferred. Specific examples thereof include linear groups such as methylthio, ethylthio, n-propylthio, and n-butylthio; and branched groups such as isopropylthio, isobutylthio, sec-butylthio, and tert-butylthio.

The (C1-C4) alkylthio group substituted with at least one kind of group selected from the group consisting of a hydroxy group, a sulfo group, and a carboxy group, which is for $R^7$, may be a (C1-C4) alkylthio group having these substituents on any of the carbon atoms. The number of the relevant substituents is usually 1 or 2, and preferably 1. There are no particular limitations on the position of the substituent, but it is preferable to have a substituent on a carbon atom other than the carbon atom to which the sulfur atom in the alkylthio group is bonded.

Specific examples thereof include hydroxy-(C1-C4) alkylthio groups such as 2-hydroxyethylthio, 2-hydroxypropylthio, and 3-hydroxypropylthio; sulfo-(C1-C4) alkylthio groups such as 2-sulfoethylthio and 3-sulfopropylthio; and carboxy-(C1-C4) alkylthio groups such as 2-carboxyethylthio, 3-carboxypropylthio, and 4-carboxybutylthio.

Among those described above, $R^7$ is preferably a sulfo-(C1-C4) alkylthio group or a carboxy-(C1-C4) alkylthio group, and a sulfo-(C1-C4) alkylthio group is more preferred, while a sulfopropylthio group is particularly preferred.

In the formula (1), the (C1-C4) alkylcarbonylamino group for $R^8$ may be an unsubstituted alkylcarbonylamino group with a linear or branched alkyl moiety, and a linear alkyl moiety is preferred. Specific examples thereof include linear groups such as acetylamino(methylcarbonylamino), propionylamino(ethylcarbonylamino), n-propylcarbonylamino, and n-butylcarbonylamino; and branched groups such as isopropylcarbonylamino, isobutylcarbonylamino, sec-butylcarbonylamino, and pivaloylamino(tert-butylcarbonylamino). Among these, linear groups are preferred, and an acetylamino group is particularly preferred.

A preferred combination of $R^7$ and $R^8$ is a combination in which $R^7$ is a sulfo-(C1-C4) alkylthio group and $R^8$ is an acetylamino group, and a combination in which $R^7$ is a sulfopropylthio group and $R^8$ is an acetylamino group is particularly preferred.

In the formula (1), examples of the (C1-C4) alkyl group for $R^9$ and $R^{10}$ include the same groups as those mentioned with regard to the (C1-C4) alkyl group for $R^1$, including preferred examples of the group.

Examples of the (C1-C4) alkoxy group for $R^9$ and $R^{10}$ include the same groups as those mentioned with regard to the (C1-C4) alkoxy group for $R^3$ and $R^4$, including preferred examples of the group.

The (C1-C4) alkoxy group substituted with at least one kind of group selected from the group consisting of a hydroxy group, a (C1-C4) alkoxy group, a sulfo group, and a carboxy group, which is for $R^9$ and $R^{10}$, may be a (C1-C4) alkoxy group having these substituents on any of the carbon atoms. The number of the relevant substituents is usually 1 or 2, and preferably 1. There are no particular limitations on the position of the substituents, but it is preferable to have a substituent on a carbon atom other than the carbon atom to which the oxygen atom in the alkoxy group is bonded.

Specific examples thereof include hydroxy-(C1-C4) alkoxy groups such as 2-hydroxyethoxy, 2-hydroxypropoxy, and 3-hydroxypropoxy; sulfo-(C1-C4) alkoxy groups such as 2-sulfoethoxy, 3-sulfopropoxy, and 4-sulfobutoxy; and carboxy-(C1-C4) alkoxy groups such as 2-carboxyethoxy, 3-carboxypropoxy, and 4-carboxybutoxy.

Among those described above, preferred examples of $R^9$ include a sulfo-(C1-C4) alkoxy group and a carboxy-(C1-C4) alkoxy group, and a sulfo-(C1-C4) alkoxy group is more preferred, while a sulfopropoxy group and a sulfobutoxy group are particularly preferred.

Among those described above, preferred examples $R^{10}$ include a (C1-C4) alkyl group, a (C1-C4) alkoxy group, a sulfo-(C1-C4) alkoxy group, a carboxy-(C1-C4) alkoxy group, and an acetylamino group, and a (C1-C4) alkyl group is more preferred, while a methyl group is particularly preferred.

A preferred combination of $R^9$ and $R^{10}$ is a combination in which $R^9$ is a sulfo-(C1-C4) alkoxy group, and $R^{10}$ is a (C1-C4) alkyl group, and a combination in which $R^9$ is a sulfopropoxy group (in particular, a 3-sulfopropoxy group is preferred) and $R^{10}$ is a methyl group, or a combination in which $R^9$ is a sulfobutoxy group (in particular, a 4-sulfobutoxy group is preferred) and $R^{10}$ is a methyl group, is particularly preferred.

In the formula (1), examples of the (C1-C4) alkyl group for $R^{11}$ to $R^{13}$ include the same groups as those mentioned with regard to the (C1-C4) alkyl group for $R^1$, including preferred examples of the group.

Examples of the (C1-C4) alkoxy group for $R^{11}$ to $R^{13}$ include the same groups as those mentioned with regard to the (C1-C4) alkoxy group for $R^3$ and $R^4$, including preferred examples of the group.

Examples of the (C1-C4) alkoxy group substituted with at least one kind of group selected from the group consisting of a hydroxy group, a (C1-C4) alkoxy group, a sulfo group and a carboxy group, which is for $R^{11}$ to $R^{13}$, include the same groups as those mentioned with regard to the (C1-C4) alkoxy group substituted with at least one kind of group selected from the group consisting of a hydroxy group, a (C1-C4) alkoxy group, a sulfo group and a carboxy group, which is for $R^5$ and $R^6$, including preferred examples of the group.

The (C1-C4) alkylsulfonyl group for $R^{11}$ to $R^{13}$ may be a linear or branched alkylsulfonyl group, and a linear group is preferred. Specific examples thereof include linear groups such as methylsulfonyl, ethylsulfonyl, n-propylsulfonyl, and n-butylsulfonyl; and branched groups such as isopropylsulfonyl and isobutylsulfonyl.

Among the groups described above, methylsulfonyl, ethylsulfonyl, and isopropylsulfonyl are preferred, and methylsulfonyl is particularly preferred.

The (C1-C4) alkylsulfonyl group substituted with at least one kind of group selected from the group consisting of a hydroxy group, a sulfo group, and a carboxy group for $R^{11}$ to $R^{13}$ may be a (C1-C4) alkylsulfonyl group in which the above-described group is substituted on any arbitrary carbon atom in the alkylsulfonyl group. The number of the relevant substituents is usually 1 or 2, and preferably 1. There are no particular limitations on the position of substituents.

Specific examples thereof include hydroxy-substituted groups such as hydroxyethylsulfonyl and 2-hydroxypropylsulfonyl; sulfo-substituted groups such as 2-sulfoethylsulfonyl and 3-sulfopropylsulfonyl; and carboxy-substituted groups such as 2-carboxyethylsulfonyl and 3-carboxypropylsulfonyl.

Among those described above, preferred examples of $R^{11}$ include a hydrogen atom, a carboxy group, a sulfo group, a nitro group, a chlorine atom, a methyl group, a methoxy group, and a (C1-C4) alkylsulfonyl group. More preferred examples include a hydrogen atom, a carboxy group, a sulfo group, a nitro group, a chlorine atom, and a (C1-C4) alkylsulfonyl group, which are electron-withdrawing substituents, a methyl group, and a methoxy group, and particularly preferred examples include a hydrogen atom and a chlorine atom.

Among those described above, preferred examples of $R^{12}$ include a hydrogen atom, a carboxy group, a sulfo group, a nitro group, a chlorine atom, a methyl group, a methoxy group, a sulfamoyl group, a (C1-C4) alkylsulfonyl group, a carboxy-(C1-C4) alkylsulfonyl group, and a sulfo-(C1-C4) alkylsulfonyl group. A hydrogen atom; a carboxy group, a sulfo group, a nitro group, a chlorine atom, a sulfamoyl group, a (C1-C4) alkylsulfonyl group, a carboxy-(C1-C4)alkylsulfonyl group, or a sulfo-(C1-C4) alkylsulfonyl group, which are all electron-withdrawing substituents; a methyl group; or a methoxy group is preferred, and a sulfo group, a nitro group, a methyl group, a methoxy group, a sulfamoyl group, a sulfopropylsulfonyl group, and a carboxyethylsulfonyl group are more preferred, while a sulfo group is particularly preferred.

Among those described above, preferred examples of $R^{13}$ include a hydrogen atom, a carboxy group, a sulfo group, a methoxy group, a nitro group, a chlorine atom, and a (C1-C4) alkylsulfonyl group. A hydrogen atom; a carboxy group, a sulfo group, a nitro group, a chlorine atom, or a (C1-C4) alkylsulfonyl group, which are all electron-withdrawing groups; or a methoxy group is preferred, and a hydrogen atom is particularly preferred.

A preferred combination of $R^{11}$ to $R^{13}$ is a combination in which $R^{11}$ is a hydrogen atom, $R^{12}$ is a sulfo group, and $R^{13}$ is a hydrogen atom; a combination in which $R^{11}$ is a hydrogen atom, $R^{12}$ is a sulfamoyl group, and $R^{13}$ is a hydrogen atom; or a combination in which $R^{11}$ is a hydrogen atom, $R^{12}$ is a chlorine atom, and $R^{13}$ is a sulfo group. A combination in which $R^{11}$ is a hydrogen atom, $R^{12}$ is a chlorine atom, and $R^{13}$ is a sulfo group, is particularly preferred.

In regard to the various substituents in the formula (1), combinations thereof, substitution positions thereof, and the like, a compound in which preferred kinds thereof previously described are combined is more preferred, and a compound in which more preferred kinds are combined is even more preferred. The same also applies to a combination of more preferred kinds with more preferred kinds, or a combination of preferred kinds with more preferred kinds.

Specific examples of preferred combinations for the formula (1) include combinations of the following items (i) to (iii). Item (ii) is more preferred than item (i), and item (iii) is most preferred.

(i) A combination in which:
$R^1$ represents a methyl group; or a phenyl group;
$R^2$ represents a cyano group; or a carbamoyl group;
$R^3$ represents a hydrogen atom; a methyl group; or a methoxy group;
$R^4$ represents a sulfo group;
$R^5$ represents a (C1-C4) alkylthio group substituted with a sulfo group or a carboxy group;
$R^6$ represents a (C1-C4) alkylcarbonylamino group;
$R^7$ represents a (C1-C4) alkylthio group substituted with a sulfo group or a carboxy group;
$R^8$ represents a (C1-C4) alkylcarbonylamino group;
$R^9$ represents a sulfo-(C1-C4) alkoxy group;
$R^{10}$ represents a (C1-C4) alkyl group; or an acetylamino group; and
$R^{11}$ to $R^{13}$ each independently represent a hydrogen atom; a carboxy group; a sulfo group; a chlorine atom; a nitro group; a methyl group; a methoxy group; a sulfamoyl group; or a (C1-C4) alkylsulfonyl group substituted with a sulfo group or a carboxy group.

(ii) A combination in which:
$R^1$ represents a methyl group;
$R^2$ represents a cyano group; a methyl group; or a methoxy group;
$R^3$ represents a hydrogen atom; a methyl group; or a methoxy group;
$R^4$ represents a sulfo group;
$R^5$ represents a sulfo-(C1-C4) alkylthio group;
$R^6$ represents a (C1-C4) alkylcarbonylamino group;
$R^7$ represents a sulfo-(C1-C4) alkylthio group;
$R^8$ represents a (C1-C4) alkylcarbonylamino group;
$R^9$ represents a sulfo-(C1-C4) alkoxy group;
$R^{10}$ represents a (C1-C4) alkyl group; or an acetylamino group; and
$R^{11}$ to $R^{13}$ each independently represent a hydrogen atom; a carboxy group; a sulfo group; a chlorine atom; a nitro group; a methyl group; a methoxy group; or a sulfamoyl group;

(iii) A combination in which:
$R^1$ represents a methyl group;
$R^2$ represents a cyano group;
$R^3$ represents a hydrogen atom; or a methoxy group;
$R^4$ represents a sulfo group;
$R^5$ represents a sulfo-(C1-C4) alkylthio group;
$R^6$ represents an acetylamino group;
$R^7$ represents a sulfo-(C1-C4) alkylthio group;
$R^8$ represents an acetylamino group;
$R^9$ represents a sulfopropoxy group; or a sulfobutoxy group;
$R^{10}$ represents a (C1-C4) alkyl group;
$R^{11}$ represents a hydrogen atom; or a sulfo group;
$R^{12}$ represents a sulfo group; or a chlorine atom; and
$R^{13}$ represents a hydrogen atom; or a sulfo group.

The azo compound represented by the formula (1) can be synthesized, for example, by a method such as described below. Furthermore, the structural formulas of the compounds in the various processes will be presented in the form of free acid.

Meanwhile, in the following formulas (6) to (13), $R^1$ to $R^{13}$ respectively have the same meanings as defined in the formula (1).

The compound represented by the following formula (6) is diazotized by a conventional method, the diazo compound thus obtained and a compound represented by the following formula (7) are subjected to a coupling reaction by a conventional method, and thereby the compound represented by the following formula (8) is obtained.

(6)

(7)

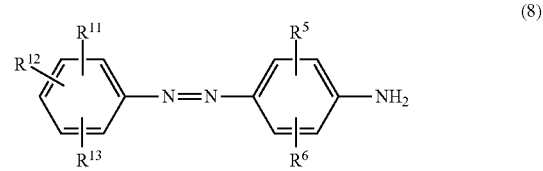

(8)

The compound represented by formula (8) and thus obtained is diazotized by a conventional method, subsequently the diazo compound thus obtained and the compound represented by the following formula (9) are subjected to a coupling reaction by a conventional method, and thereby the compound represented by the following formula (10) is obtained.

(9)

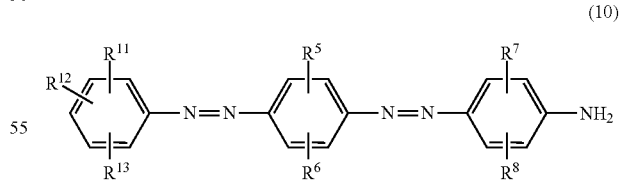

(10)

The compound represented by the formula (10) and thus obtained is diazotized by a conventional method, subsequently the diazo compound thus obtained and the compound represented by the following formula (11) are subjected to a coupling reaction by a conventional method, and thereby the compound represented by the following formula (12) is obtained.

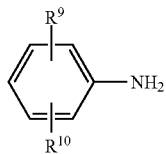

(11)

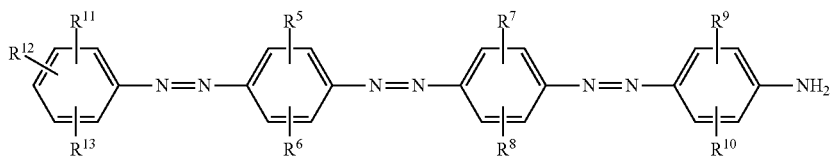

(12)

The compound represented by the formula (12) and thus obtained is diazotized by a conventional method, subsequently the diazo compound thus obtained and the compound represented by the following formula (13) are subjected to a coupling reaction by a conventional method, and thereby the azo compound represented by the formula (1) described above is obtained.

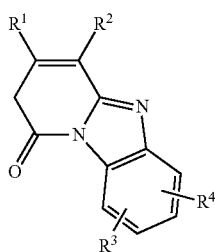

(13)

Meanwhile, the compound represented by the formula (13) can be synthesized by the method described in Patent Document 6.

Specific suitable examples of the azo compound of the present invention represented by the formula (1) include, but are not particularly limited to, compounds represented by the structural formulas listed in the following Tables 1 to 16.

In each table, functional groups such as a sulfo group and a carboxy group will be described, for convenience, in the form of free acid.

TABLE 1

| Compound No. | Structural formula |
|---|---|
| (1)-1 | (structure) |
| (1)-2 | (structure) |

TABLE 1-continued

| Compound No. | Structural formula |
|---|---|
| (1)-3 | |
| (1)-4 | |
| (1)-5 | |
| (1)-6 | |

TABLE 2

| Compound No. | Structural formula |
|---|---|
| (1)-7 | |

TABLE 2-continued
| Compound No. | Structural formula |
|---|---|
| (1)-8 | 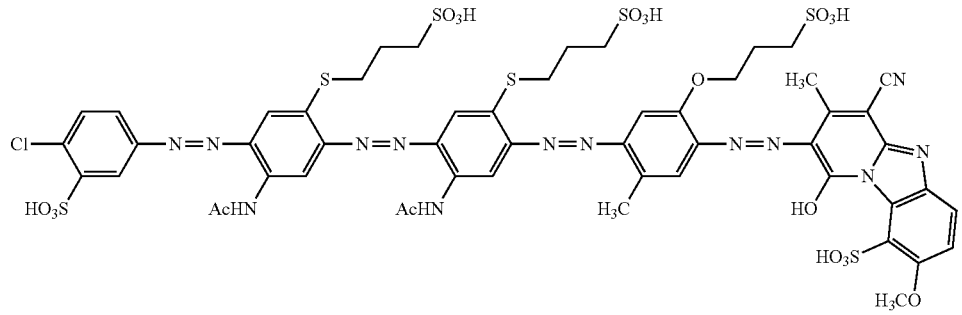 |
| (1)-9 | 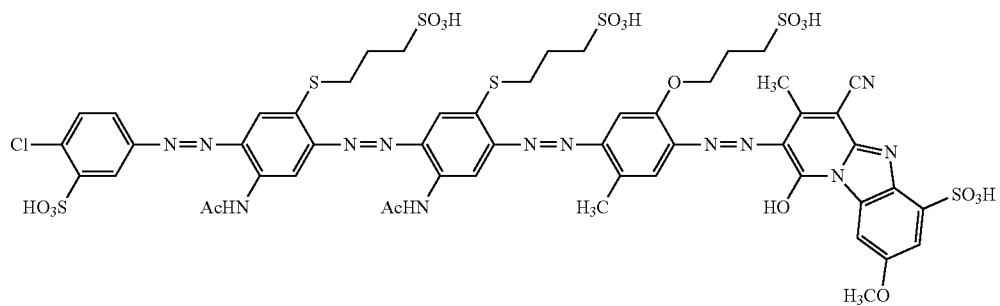 |
| (1)-10 | 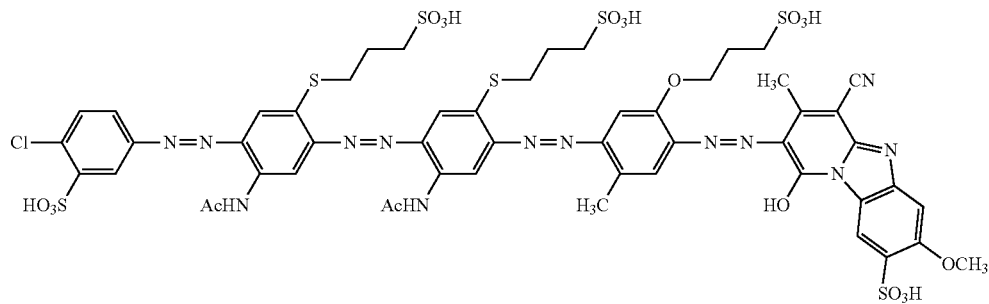 |
| (1)-11 | 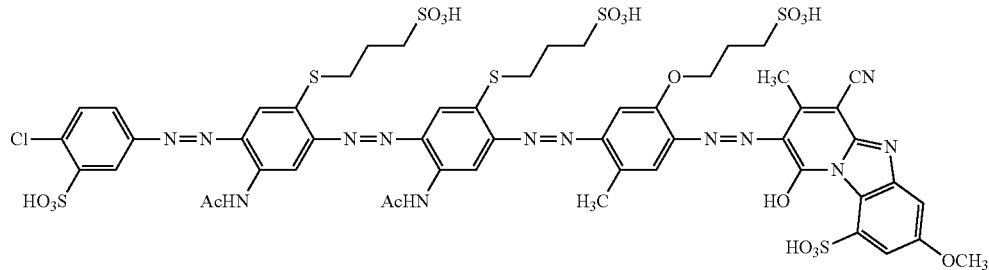 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)cc(C)c6n5c4O)cc3C)cc2NC(C)=O)c(SCCCS(=O)(=O)O)cc1N=Nc1ccc(Cl)c(S(=O)(=O)O)c1] |
| (1)-12 | 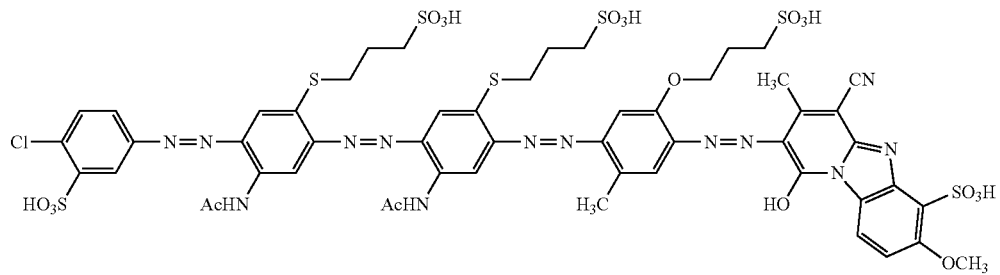 [SMILES: COc1ccc2c(nc3c(C#N)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n32)c1S(=O)(=O)O] |

TABLE 3

| Compound No. | Structural formula |
| --- | --- |
| (1)-13 | |
| (1)-14 | |
| (1)-15 | |
| (1)-16 | |
| (1)-17 | |

TABLE 3-continued

| Compound No. | Structural formula |
| --- | --- |
| (1)-18 | (structure) |

TABLE 4

| Compound No. | Structural formula |
| --- | --- |
| (1)-19 | (structure) |
| (1)-20 | (structure) |
| (1)-21 | (structure) |
| (1)-22 | (structure) |

TABLE 4-continued

| Compound No. | Structural formula |
|---|---|
| (1)-23 | |
| (1)-24 | |

TABLE 5

| Compound No. | Structural formula |
|---|---|
| (1)-25 | |
| (1)-26 | |
| (1)-27 | |

TABLE 5-continued

| Compound No. | Structural formula |
|---|---|
| (1)-28 | |
| (1)-29 | |
| (1)-30 | |

TABLE 6

| Compound No. | Structural formula |
|---|---|
| (1)-31 | |
| (1)-32 | |

TABLE 6-continued

| Compound No. | Structural formula |
|---|---|
| (1)-33 | *(structure image)* |
| (1)-34 | *(structure image)* |
| (1)-35 | *(structure image)* |
| (1)-36 | *(structure image)* |

TABLE 7

| Compound No. | Structural formula |
|---|---|
| (1)-37 | *(structure image)* |

TABLE 7-continued
| Compound No. | Structural formula |
|---|---|
| (1)-38 | 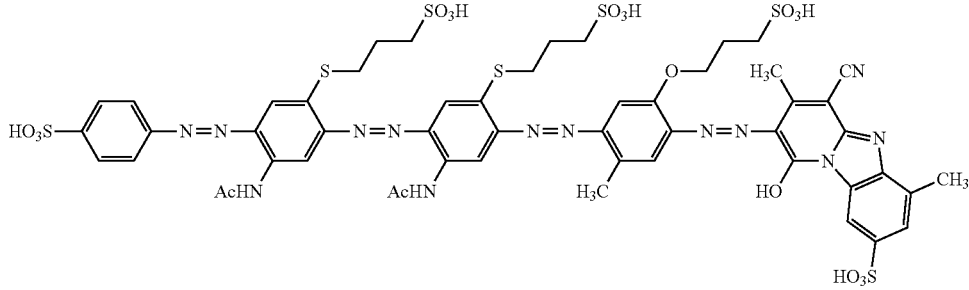 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(C)cc(S(=O)(=O)O)cc6n5c4O)cc3C)cc2NC(C)=O)c(SCCCS(=O)(=O)O)cc1N=Nc1ccc(S(=O)(=O)O)cc1] |
| (1)-39 | 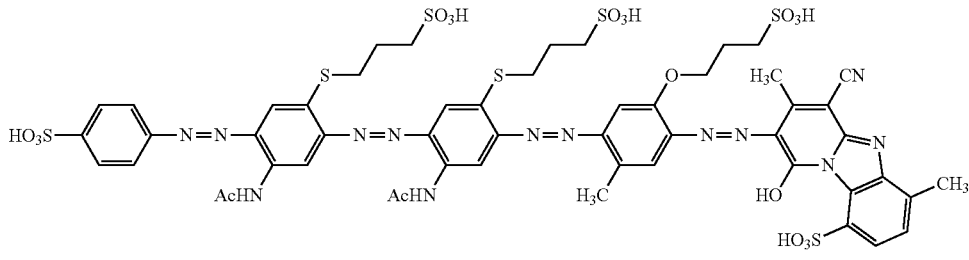 |
| (1)-40 | 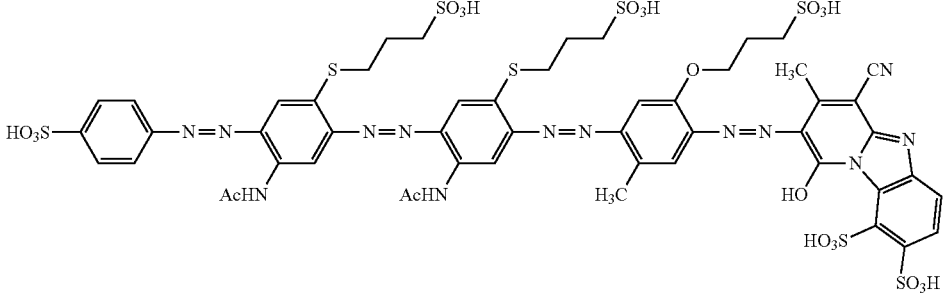 |
| (1)-41 | 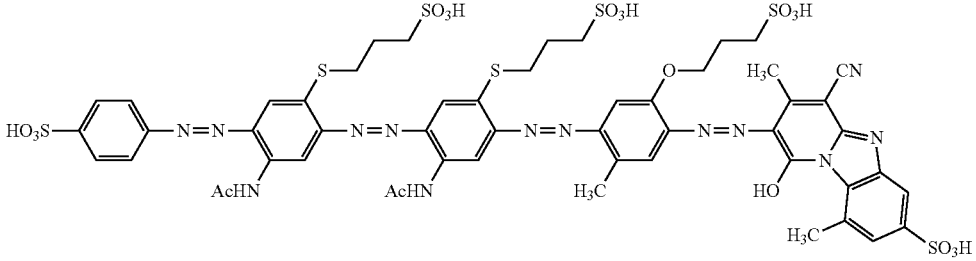 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6cc(S(=O)(=O)O)cc(C)c6n5c4O)cc3C)cc2NC(C)=O)c(SCCCS(=O)(=O)O)cc1N=Nc1ccc(S(=O)(=O)O)cc1] |
| (1)-42 | 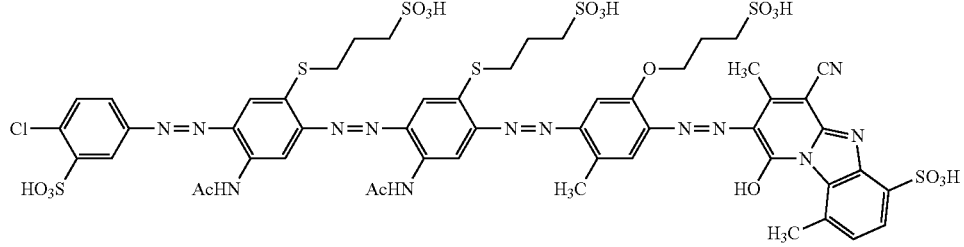 |

TABLE 8

| Compound No. | Structural formula |
| --- | --- |
| (1)-43 | |
| (1)-44 | |
| (1)-45 | |
| (1)-46 | |
| (1)-47 | |

TABLE 8-continued

| Compound No. | Structural formula |
|---|---|
| (1)-48 | |

TABLE 9

| Compound No. | Structural formula |
|---|---|
| (1)-49 | |
| (1)-50 | |
| (1)-51 | |
| (1)-52 | |

TABLE 9-continued
| Compound No. | Structural formula |
|---|---|
| (1)-53 | 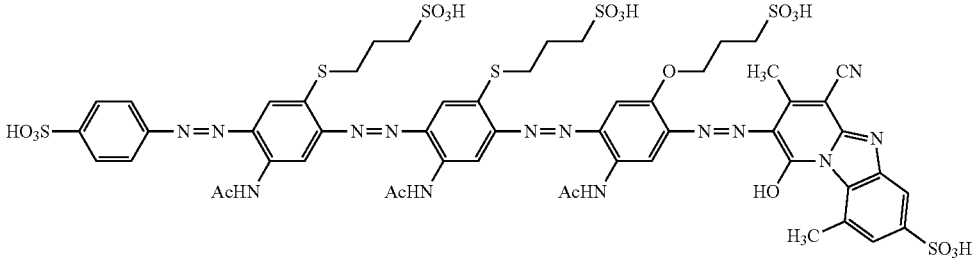 |
| (1)-54 | 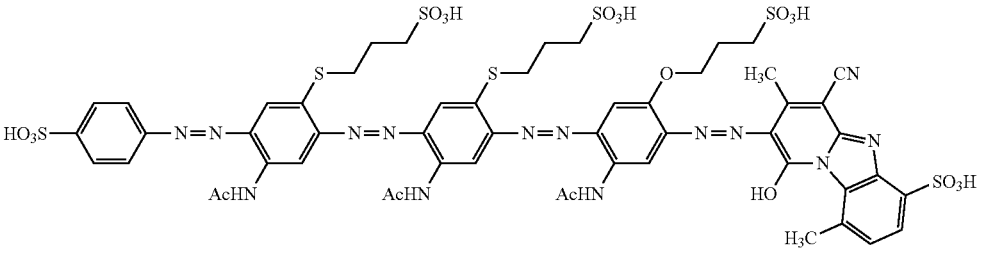 [SMILES: CC(=O)Nc1cc(N=Nc2cc(SCCCS(=O)(=O)O)c(N=Nc3cc(OCCCS(=O)(=O)O)c(N=Nc4c(C)c(C#N)c5nc6c(S(=O)(=O)O)ccc(C)c6n5c4O)cc3NC(C)=O)cc2NC(C)=O)c(SCCCS(=O)(=O)O)cc1N=Nc1ccc(S(=O)(=O)O)cc1] |
TABLE 10
| Compound No. | Structural formula |
|---|---|
| (1)-55 | 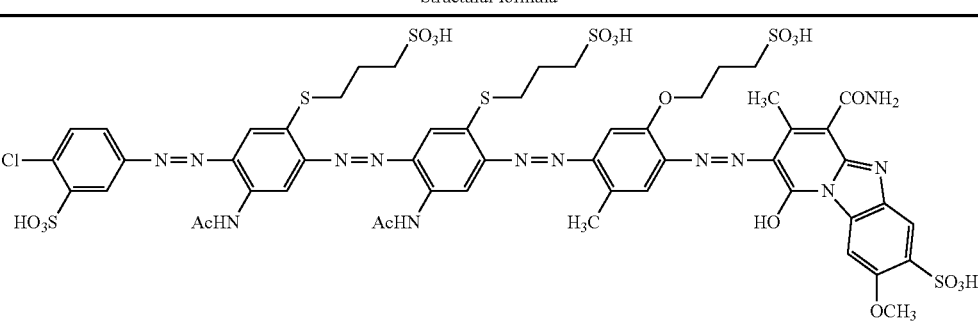 |
| (1)-56 | 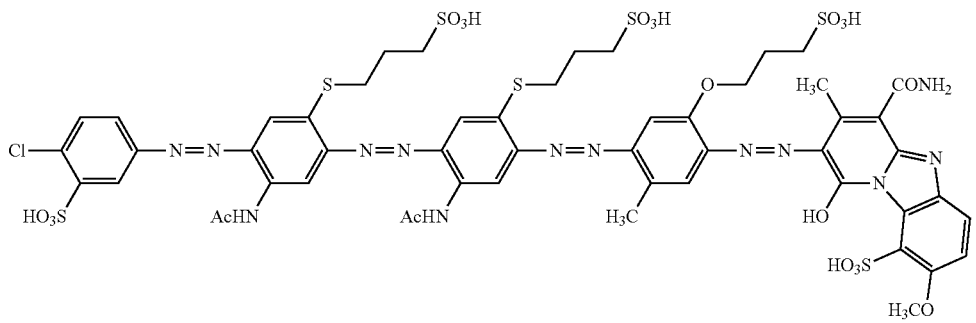 [SMILES: COc1ccc2nc3c(C(N)=O)c(C)c(N=Nc4cc(C)c(N=Nc5cc(NC(C)=O)c(N=Nc6cc(NC(C)=O)c(N=Nc7ccc(Cl)c(S(=O)(=O)O)c7)cc6SCCCS(=O)(=O)O)cc5SCCCS(=O)(=O)O)cc4OCCCS(=O)(=O)O)c(O)n3c2c1S(=O)(=O)O] |
| (1)-57 | 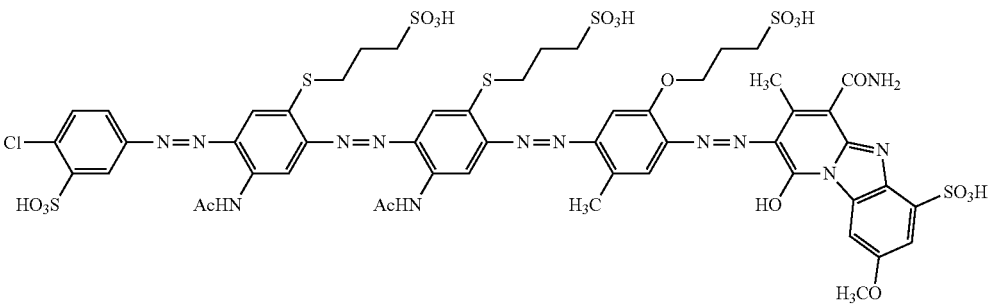 [SMILES: COc1cc(S(=O)(=O)O)c2nc3c(C#N)c(C)c(N=Nc4cc(NC(C)=O)c(N=Nc5cc(NC(C)=O)c(N=Nc6cc(NC(C)=O)c(N=Nc7ccc(Cl)c(C(=O)O)c7)cc6SCCCS(=O)(=O)O)cc5SCCCS(=O)(=O)O)cc4OCCCS(=O)(=O)O)c(O)n3c2c1] |

TABLE 10-continued

| Compound No. | Structural formula |
|---|---|
| (1)-58 | |
| (1)-59 | |
| (1)-60 | |

TABLE 11

| Compound No. | Structural formula |
|---|---|
| (1)-61 | |
| (1)-62 | |

TABLE 11-continued

| Compound No. | Structural formula |
| --- | --- |
| (1)-63 | |
| (1)-64 | |
| (1)-65 | |
| (1)-66 | |

TABLE 12

| Compound No. | Structural formula |
| --- | --- |
| (1)-67 | |

TABLE 12-continued

| Compound No. | Structural formula |
|---|---|
| (1)-68 | |
| (1)-69 | |
| (1)-70 | |
| (1)-71 | |
| (1)-72 | |

TABLE 13
| Compound No. | Structural formula |
|---|---|
| (1)-73 | 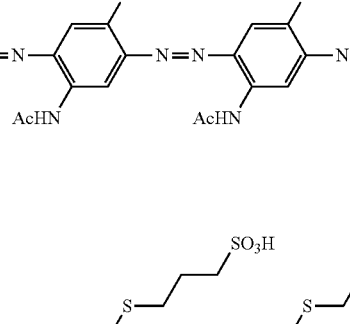 |
| (1)-74 | 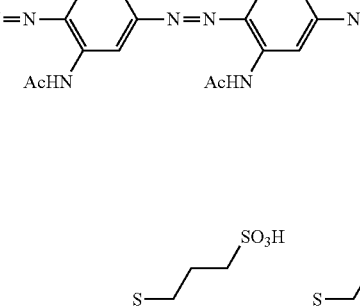 |
| (1)-75 | 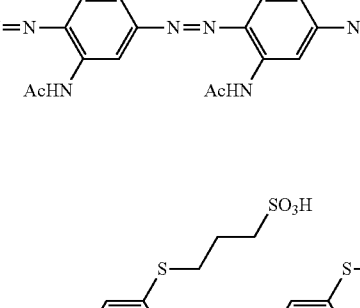 |
| (1)-76 | 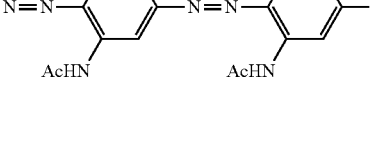 |
| (1)-77 | 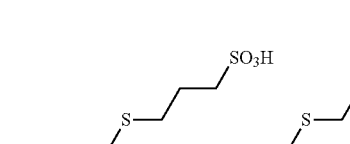 |

TABLE 13-continued

| Compound No. | Structural formula |
| --- | --- |
| (1)-78 | |

TABLE 14

| Compound No. | Structural formula |
| --- | --- |
| (1)-79 | |
| (1)-80 | |
| (1)-81 | |

TABLE 14-continued

| Compound No. | Structural formula |
|---|---|
| (1)-82 | |
| (1)-83 | |
| (1)-84 | |

TABLE 15

| Compound No. | Structural formula |
|---|---|
| (1)-85 | |
| (1)-86 | |

TABLE 15-continued

| Compound No. | Structural formula |
|---|---|
| (1)-87 | |
| (1)-88 | |
| (1)-89 | |
| (1)-90 | |

TABLE 16

| Compound No. | Structural formula |
|---|---|
| (1)-91 | |

TABLE 16-continued

| Compound No. | Structural formula |
| --- | --- |
| (1)-92 | |
| (1)-93 | |
| (1)-94 | |
| (1)-95 | |
| (1)-96 | |

Diazotization of the compound represented by the formula (6) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 30° C., and preferably 0° C. to 15° C.

Coupling of the diazotization product of the compound represented by the formula (6) and the compound represented by the formula (7) is also carried out under conditions that are known per se. It is advantageous to carry out the coupling in water or an aqueous organic medium at a temperature of, for example, −5° C. to 30° C., and preferably 0° C. to 25° C., and at a pH value ranging from acidity to neutrality, for example, at pH 1 to 6. Since the diazotization-reaction liquid is acidic and the reaction system becomes further acidified as a result of the progress of the coupling reaction, adjustment of the pH value of the reaction liquid to preferred conditions is carried out by the addition of a base. As the base, for example, an alkali-metal hydroxide such as lithium hydroxide or sodium hydroxide; an alkali-metal carbonate such as lithium carbonate, sodium carbonate, or potassium carbonate; an acetic acid salt such as sodium acetate; ammonia; or an organic amine can be used.

The compound represented by the formula (6) and the compound represented by the formula (7) are used in near-stoichiometric amounts.

Diazotization of the compound represented by the formula (8) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 40° C., and preferably 5° C. to 30° C.

Coupling of the diazotization product of the compound represented by the formula (8) and the compound represented by the formula (9) is also carried out under conditions that are known per se. It is advantageous to carry out the reaction in water or an aqueous organic medium at a temperature of, for example, −5° C. to 40° C., and preferably 10° C. to 30° C., and at a pH value ranging from acidity to neutrality, for example, at pH 2 to 7. Since the diazotization reaction liquid is acidic, and the reaction system becomes further acidified by the progress of the coupling reaction, adjustment of the pH value of the reaction liquid to preferred conditions is carried out by the addition of a base. Regarding the base, the same bases as those described above can be used.

The compound represented by the formula (8) and the compound represented by the formula (9) are used in near-stoichiometric amounts.

Diazotization of the compound represented by the formula (10) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 50° C., and preferably 5° C. to 40° C.

Coupling of the diazotization product of the compound represented by the formula (10) and the compound represented by the formula (11) is also carried out under conditions that are known per se. It is advantageous to carry out the reaction in water or an aqueous organic medium at a temperature of, for example, −5° C. to 50° C., and preferably 10° C. to 40° C., and at a pH value ranging from acidity to neutrality, for example, at pH 2 to 7. Since the diazotization reaction liquid is acidic, and the reaction system becomes further acidified as the coupling reaction progresses, adjustment of the pH value of the reaction liquid to preferred conditions is carried out by the addition of a base. Regarding the base, the same bases as those described above can be used.

The compound represented by the formula (10) and the compound represented by the formula (11) are used in near-stoichiometric amounts.

Diazotization of the compound represented by the formula (12) is carried out by a method that is known per se, and is carried out, for example, by using a nitrous acid salt, for example, a nitrous acid alkali-metal salt such as sodium nitrite, in an inorganic acid medium at a temperature of, for example, −5° C. to 50° C., and preferably 10° C. to 40° C.

Coupling of the diazotization product of the compound represented by the formula (12) and the compound represented by the formula (13) is also carried out under conditions that are known per se. It is advantageous to carry out the reaction in water or an aqueous organic medium at a temperature of, for example, −5° C. to 50° C., and preferably 10° C. to 40° C., and at a pH value ranging from weak acidity to alkalinity. The reaction is carried out preferably at a pH value ranging from weak acidity to weak alkalinity, for example, at pH 5 to 10, and adjustment of the pH value is carried out by the addition of a base. Regarding the base, the same bases as those described above can be used.

The compound represented by the formula (12) and the compound represented by the formula (13) are used in near-stoichiometric amounts.

The coloring matter (II) contained in the ink composition of the present invention is one or more kinds of the coloring matter represented by the formula (2). That is, the coloring matter (II) may be a single coloring matter represented by the formula (2), or may be a mixture of plural coloring matters represented by the formula (2); however, the coloring matter (II) is preferably a single coloring matter.

In the formula (2), the unsubstituted (C1-C4) alkyl group for $R^a$ may be a linear or branched alkyl group, and a linear group is preferred. Specific examples thereof include linear groups such as methyl, ethyl, n-propyl, and n-butyl; and branched groups such as isopropyl, isobutyl, sec-butyl, and tert-butyl. Among them, methyl, ethyl, and n-propyl are preferred, and methyl is particularly preferred.

The (C1-C4) alkyl group substituted with a hydroxy group or a (C1-C4) alkoxy group with regard to $R^a$ may be a linear or branched alkyl group, and a linear group is preferred. Specific examples thereof include hydroxy-substituted groups such as 2-hydroxyethyl; and (C1-C4) alkoxy-substituted groups such as methoxyethyl, ethoxyetyl, n-propoxyethyl, isopropoxyethyl, n-butoxyethyl, sec-butoxyethyl, and tert-butoxyethyl.

The unsubstituted (C1-C4) alkoxy group for $R^a$ may be a linear or branched alkoxy group, and a linear group is preferred. Specific examples thereof include linear groups such as methoxy, ethoxy, n-propoxy, and n-butoxy; and branched groups such as isopropoxy, isobutoxy, sec-butoxy, and tert-butoxy. Among them, methoxy, ethoxy and n-propoxy are preferred, and methoxy is particularly preferred.

The (C1-C4) alkoxy group substituted with a hydroxy group or a (C1-C4) alkoxy group with regard to $R^a$ may be a linear or branched alkoxy group, and a linear group is preferred. Specific examples thereof include hydroxy-substituted groups such as 2-hydroxyethoxy, 2-hydroxypropoxy, and 3-hydroxypropoxy; linear or branched, and preferably linear, (C1-C4) alkoxy-substituted groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, and n-propoxybutoxy; and hydroxy and alkoxy-composite-substituted groups such as 2-hydroxyethoxyethoxy.

Examples of the unsubstituted (C1-C4) alkylamino group for $R^a$ include mono-(unsubstituted linear or branched alkyl) amino groups such as methylamino, ethylamino, n-propylamino, isopropylamino, n-butylamino, and isobutylamino; and di(unsubstituted linear or branched alkyl)amino groups such as N,N-dimethylamino, N,N-diethylamino, N,N-di(n-propyl)amino, and N,N-di(isopropyl)amino.

Examples of the (C1-C4) alkylamino group substituted with a hydroxy group or a (C1-C4) alkoxy group with regard to $R^a$ include mono(hydroxy-substituted alkyl)amino groups such as hydroxyethylamino, 2-hydroxypropylamino, and 3-hydroxypropylamino; bis(hydroxy-substituted alkyl)amino groups such as bis(hydroxyethyl)amino; mono (alkoxy-substituted alkyl)amino groups such as methoxyethylamino and ethoxyethylamino; and bis(alkoxy-substituted alkyl)amino groups such as bis(methoxyethyl)amino and bis(2-ethoxyethyl)amino.

The carboxy-(C1-C5) alkylamino group for $R^a$ may be a linear or branched group, and a linear group is preferred. Specific examples thereof include carboxymethylamino, carboxyethylamino, carboxypropylamino, carboxy-n-butylamino, and carboxy-n-pentylamino.

The bis(carboxy-(C1-C5) alkyl)amino group for $R^a$ may be a linear or branched group, and a linear group is preferred. Specific examples thereof include bis(carboxymethyl)amino, bis(carboxyethyl)amino, and bis(carboxypropyl)amino.

The unsubstituted (C1-C4) alkanoylamino group for $R^a$ may be a linear or branched group, and a linear group is preferred. Specific examples thereof include linear groups such as acetylamino and n-propionylamino; and branched groups such as isopropionylamino.

The (C1-C4) alkanoylamino group substituted with a hydroxy group or a (C1-C4) alkoxy group with regard to $R^a$ may be a linear or branched group, and a linear group is preferred. Specific examples thereof include hydroxy-substituted groups such as hydroxyacetylamino, 2-hydroxy-n-propionylamino, 3-hydroxy-n-propionylamino, 2-hydroxy-n-butyrylamino, and 3-hydroxy-n-butyrylamino; and alkoxy-substituted groups such as 2-methoxy-n-propionylamino, 3-methoxy-n-propionylamino, 2-methoxy-n-butyrylamino, and 3-methoxy-n-butyrylamino.

Examples of the phenylamino group having the benzene ring substituted with at least one kind of group selected from the group consisting of a carboxy group, a sulfo group, and an amino group with regard to $R^a$, include carboxy-substituted groups such as 2-, 3-, or 4-carboxyphenylamino and 3,5-biscarboxyphenylamino; sulfo-substituted groups such as 2-, 3-, or 4-sulfophenylamino; amino-substituted groups such as 2-aminopheylamino and 3,5-diaminophenylamino; and sulfo- and amino-substituted groups such as diaminosulfophenylamino. Among the groups described above, $R^a$ is preferably an unsubstituted (C1-C4) alkyl group, and above all, methyl is particularly preferred.

In formula (2), the aliphatic amino group substituted with a carboxy group or a sulfo group with regard to X may be a mono-(C1-C5) alkylamino group or di-((C1-C5) alkyl)amino group substituted with a carboxy group or a sulfo group, such as a sulfo-(C1-C5) alkylamino group; a carboxy-(C1-C5) alkylamino group; a di(sulfo-(C1-C5) alkyl)amino group; or a di(carboxy-(C1-C5) alkyl)amino group, which are all linear or branched groups, and preferably a linear group. The number of carbon atoms is usually in the range C1-C5, preferably C1-C4, more preferably C1-C3, and even more preferably C1-C2.

Specific examples thereof include sulfo-(C1-C5) alkylamino groups such as sulfomethylamino, sulfoethylamino, sulfopropylamino, sulfobutylamino, and sulfopentylamino; carboxy-(C1-C5) alkylamino groups such as carboxymethylamino, carboxyethylamino, carboxypropylamino, carboxybutylamino, and carboxypentylamino; di(sulfo-(C1-C5) alkyl)amino groups such as di(sulfomethyl)amino, di(sulfoethyl)amino, and di(sulfopropylamino); and di(carboxy-(C1-C5) alkyl)amino groups such as di(carboxymethyl)amino.

Among the groups described above, X is preferably a sulfo-(C1-C5) alkylamino group, or a di(carboxy-(C1-C5) alkyl)amino group, while the former is more preferred, and even for the former, sulfoethylamino is particularly preferred.

Among the coloring matters (II) represented by the formula (2), preferred is the coloring matter represented by the formula (3). In the formula (3), X has the same meaning as defined in the formula (2), and preferred examples are also the same.

Among the coloring matters (II) represented by the formula (2), the most preferred is a coloring matter represented by the following formula (14).

(14)

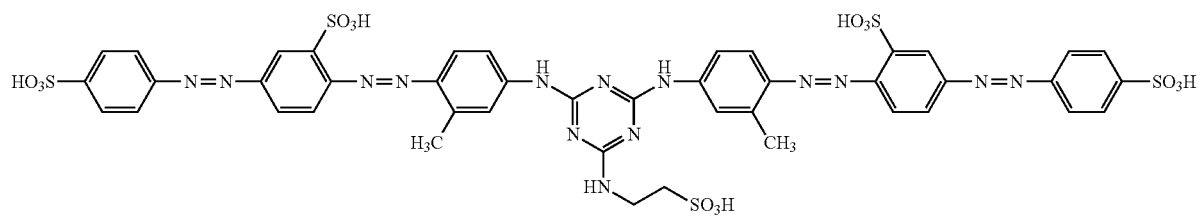

The coloring matter (II) represented by the formula (2) can be obtained according to the method described in Patent Document 3.

Coloring matter (III) is a coloring matter having an azo group, and a coloring matter that is a water-soluble compound having one or two azo groups in one molecule and that is a water-soluble yellow dye is preferred. However, the coloring matters included in the coloring matters (I) and (II) are excluded. Meanwhile, the azo group means a group represented by the formula: "—N=N-".

Here, the water-soluble yellow dye is a dye that has been made to exhibit solubility in water by having a sulfo group or a carboxy group, and specific examples thereof include coloring matters exhibiting a solubility of 50 g/kg or more as the solubility in water. The coloring matter having the solubility described above is preferably a coloring matter exhibiting a solubility of 80 g/kg or more, and more preferably 100 g/kg or more.

Specific examples of the coloring matter (III) that can be used include known yellow coloring matters (for example, C.I. Direct Yellow 34, C.I. Direct Yellow 58, C.I. Direct Yellow 86, C.I. Direct Yellow 120, C.I. Direct Yellow 132, and C.I. Direct Yellow 142), orange coloring matters (for example, C.I. Direct Orange 17, C.I. Direct Orange 26, C.I. Direct Orange 29, C.I. Direct Orange 39, and C.I. Direct Orange 49), and brown coloring matters (for example, C.I. Brown 104), but among the coloring matters listed above, C.I.

Direct Yellow 86, C.I. Direct Yellow 132, and C.I. Direct Yellow 142 are preferred, while C.I. Direct Yellow 132 is more preferred.

Specific preferred examples of the coloring matter (III) include the coloring matter represented by the following formula (15) or a salt thereof (hereinafter, for the same reason as described above, both the "coloring matter or a salt thereof" will be collectively described in short as "coloring matter").

An ink using the coloring matter represented by the following formula (15) as the coloring matter (III) can produce printed matters having excellent light resistance and ozone resistance, and particularly excellent moisture resistance, as compared with the various dyes denoted by the C.I. numbers, which is preferable.

Among the groups described above, R is preferably an unsubstituted (C1-C4) alkoxy group, and above all, a methoxy group is particularly preferred.

In the formula (15), n represents 1 or 2, and is preferably 1.

The substitution position of "—(SO$_3$H)n", whose substitution position is not specified, on the benzene ring is not particularly limited; however, with the substitution position of the nitrogen atom on the benzene ring being designated as the 1-position, when n is 2, the substitution position is preferably the 2-position or the 4-position. Similarly, when n is 1, the 4-position is preferred.

In the formula (15), m represents an integer from 1 to 3, and is preferably 1 or 2.

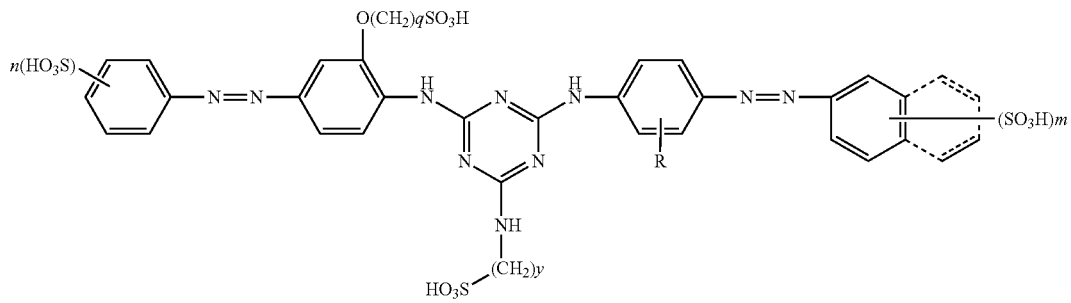

(15)

In the formula (15), R represents a hydrogen atom, an unsubstituted (C1-C4) alkyl group, an unsubstituted (C1-C4) alkoxy group, or a sulfo group; n represents an integer of 1 or 2; m represents an integer from 1 to 3; q represents an integer from 2 to 4; y represents an integer from 1 to 3; and the ring substituted with (SO$_3$H)m represents a benzene ring when the ring indicated by broken lines is absent, and a naphthalene ring when the ring indicated by broken lines is present.

The coloring matter represented by the formula (15) may be a single coloring matter, or may be a mixture of plural coloring matters represented by the formula (15); however, the coloring matter is preferably a single coloring matter.

In the formula (15), examples of the unsubstituted (C1-C4) alkyl group for R include the same groups listed for the unsubstituted (C1-C4) alkyl group for R$^a$ in the formula (2), including preferred examples.

Examples of the unsubstituted (C1-C4) alkoxy group for R include the same groups listed for the unsubstituted (C1-C4) alkoxy group for R$^a$ in the formula (2), including preferred examples.

The substitution position of the "—(SO$_3$H)m", whose substitution position is not specified, on the ring to be substituted is not particularly limited. When the ring is not a ring indicated by broken lines, that is, when the ring is a benzene ring, it is more preferable that m be 1, and that "—(SO$_3$H)m" be substituted at the 3-position in the case where the substitution position of the nitrogen atom on the benzene ring is designated as the 1-position. Similarly, when the ring is a ring indicated by broken lines, that is, the ring is a naphthalene ring, it is more preferable that m be 2, and that "—(SO$_3$H)m" be substituted at the 5-position and the 7-position, at the 6-position and the 8-position, or at the 4-position and the 8-position, in the case where the substitution position of the nitrogen atom on the naphthalene ring is designated as the 2-position.

In the formula (15), q represents an integer from 2 to 4, and is preferably 3.

Furthermore, y represents an integer from 1 to 3, and is preferably 2.

A preferred example of the coloring matter represented by the formula (15) is a coloring matter represented by the following formula (16).

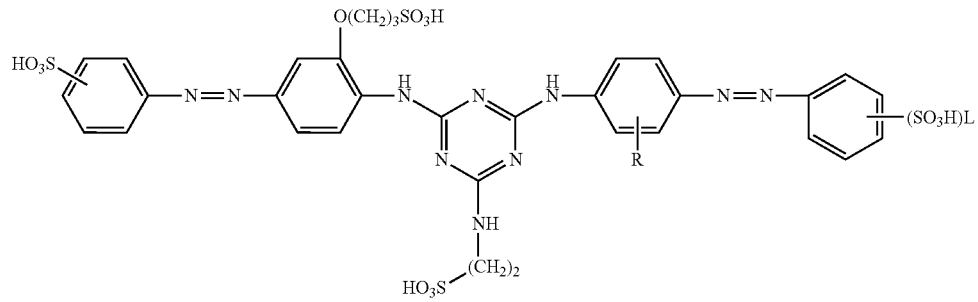

(16)

In the formula (16), R has the same meaning as defined in the formula (15), and preferred examples are also the same. L represents 1 or 2, and preferably 1.

Among the coloring matters represented by the formula (15), the most preferred coloring matter is the coloring matter represented by the following formula (17).

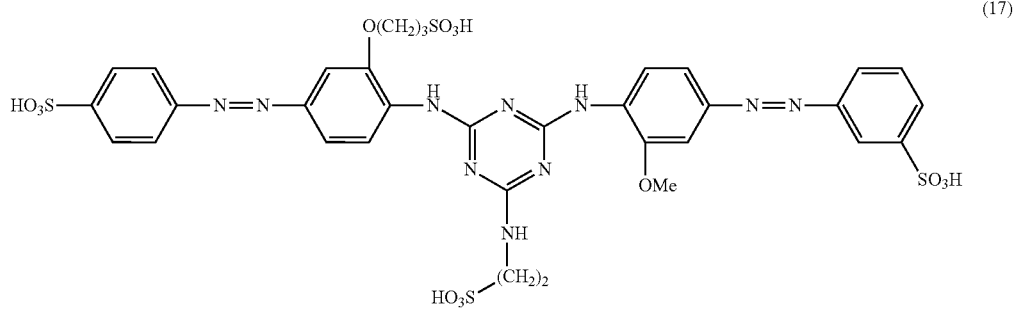

(17)

Regarding the dye as coloring matter (III), known dyes are readily available from the market. Furthermore, the water-soluble yellow dye represented by the formula (15), which has a more preferred structure, can be obtained by the method described in Patent Document 4.

The salts of the coloring matter (I), the coloring matter (II) and the coloring matter (III) used in the ink composition of the present invention are salts with inorganic or organic cations. Among them, examples of salts with inorganic cations include alkali-metal salts, alkaline-earth metal salts, and ammonium salts, and preferred examples of inorganic salts include salts of lithium, sodium, and potassium and ammonium salts. On the other hand, examples of salts with organic cations include, but are not limited to, salts with the quaternary ammonium represented by the following formula (18).

Furthermore, the free acid, tautomers thereof, and various salts of the free acid and the tautomers may be mixtures. For example, any combination of a mixture of a sodium salt and an ammonium salt, a mixture of a free acid and a sodium salt, a mixture of a lithium salt, a sodium salt and an ammonium salt, and the like may be used. There are occasions on which property values such as solubility may vary depending on the kind of the salt, and a mixture having properties that serve the purpose can be also obtained by selecting an appropriate kind of salt as necessary, or, in the case of including plural salts or the like, by changing their ratio.

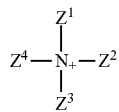

(18)

In the formula (18), $Z^1$, $Z^2$, $Z^3$, and $Z^4$ each independently represent a group selected from the group consisting of a hydrogen atom, an alkyl group, a hydroxyalkyl group, and a hydroxyalkoxyalkyl group, and at least any one of them represents a group other than a hydrogen atom.

Specific examples of the alkyl group for $Z^1$, $Z^2$, $Z^3$, and $Z^4$ in the formula (18) include methyl, ethyl, n-propyl, isopropyl, n-butyl, isobutyl, sec-butyl, and t-butyl; and specific examples of the hydroxyalkyl group include hydroxy-(C1-C4) alkyl groups such as hydroxymethyl, hydroxyethyl, 3-hydroxypropyl, 2-hydroxypropyl, 4-hydroxybutyl, 3-hydroxybutyl, and 2-hydroxybutyl. Specific examples of the hydroxyalkoxyalkyl group include hydroxy-(C1-C4) alkoxy-(C1-C4) alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among these, a hydroxyethoxy-(C1-C4) alkyl is preferred. Particularly preferred examples include a hydrogen atom; methyl; a hydroxy-(C1-C4) alkyl group such as hydroxymethyl, hydroxyethyl, 3-hydroxypropyl, 2-hydroxypropyl, 4-hydroxybutyl, 3-hydroxybutyl, or 2-hydroxybutyl; and a hydroxyethoxy-(C1-C4) alkyl group such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, or 2-hydroxyethoxybutyl.

Specific examples of the combination of $Z^1$, $Z^2$, $Z^3$, and $Z^4$ in preferred compounds represented by the formula (18) will be presented in the following Table 17.

TABLE 17

| Compound No. | $Z^1$ | $Z^2$ | $Z^3$ | $Z^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | $-C_2H_4OH$ | $-C_2H_4OH$ | $-C_2H_4OH$ |
| 1-4 | $CH_3$ | $-C_2H_4OH$ | $-C_2H_4OH$ | $-C_2H_4OH$ |
| 1-5 | H | $-CH_2CH(OH)CH_3$ | $-CH_2CH(OH)CH_3$ | $-CH_2CH(OH)CH_3$ |
| 1-6 | $CH_3$ | $-CH_2CH(OH)CH_3$ | $-CH_2CH(OH)CH_3$ | $-CH_2CH(OH)CH_3$ |
| 1-7 | H | $-C_2H_4OH$ | H | $-C_2H_4OH$ |
| 1-8 | $CH_3$ | $-C_2H_4OH$ | H | $-C_2H_4OH$ |
| 1-9 | H | $-CH_2CH(OH)CH_3$ | H | $-CH_2CH(OH)CH_3$ |
| 1-10 | $CH_3$ | $-CH_2CH(OH)CH_3$ | H | $-CH_2CH(OH)CH_3$ |
| 1-11 | $CH_3$ | $-C_2H_4OH$ | $CH_3$ | $-C_2H_4OH$ |
| 1-12 | $CH_3$ | $-CH_2CH(OH)CH_3$ | $CH_3$ | $-CH_2CH(OH)CH_3$ |

The ink composition of the present invention will be described.

The ink composition of the present invention containing the coloring matter (I), the coloring matter (II), and the coloring matter (III) is capable of coloring a material formed of cellulose. Furthermore, the ink composition is also capable of coloring a material having carbonamide bonds, and can be widely used for materials such as leather, fabrics, and paper.

In the respective synthesis reactions for the coloring matter (I), the coloring matter (II), and the coloring matter (III), the respective reaction liquids obtained after completion of the final process can be directly used in the preparation of the ink composition of the present invention. However, first the respective coloring matters are isolated by individually drying, for example, spray-drying, the reaction liquids containing the respective coloring matters; performing salting-out by adding an inorganic salt such as sodium chloride, potassium chloride, calcium chloride, or sodium sulfate; performing acid-out by adding a mineral acid such as hydrochloric acid, sulfuric acid, or nitric acid; performing acid-salting-out combining the salting-out and the acid-out; or the like, and an ink composition can be prepared by mixing these coloring matters.

The ink composition of the present invention contains the coloring matter (I), the coloring matter (II), and the coloring matter (III) as coloring matters. The coloring matter (I) and the coloring matter (II) may be each a single coloring matter to the extent that the particular conditions described above are satisfied, or may be each a mixture of plural coloring matters. Furthermore, the coloring matter (III) is a coloring matter having an azo group other than the coloring matters (I) and (II), and is preferably a coloring matter that is a compound having one or two azo groups in one molecule and is a water-soluble yellow dye. Therefore, the ink composition of the present invention is a blend of at least three or more kinds of coloring matters.

The proportion of the coloring matter (I) relative to the total mass of the coloring matters contained in the ink composition of the present invention is 50% to 90% by mass, and preferably 60% to 90% by mass; the proportion of the coloring matter (II) is 3% to 30% by mass, and preferably 3% to 15% by mass; and the proportion of the coloring matter (III) is 3% to 30% by mass, and preferably 3% to 25% by mass.

Furthermore, the total content of the coloring matter (I), the coloring matter (II), and the coloring matter (III) is usually 0.1% to 20% by mass, preferably 1% to 10% by mass, and more preferably 2% to 8% by mass, relative to the total mass of the ink composition.

The ink composition of the present invention may further contain a water-soluble organic solvent in an amount of, for example, 0% to 30% by mass, and an ink modifier in an amount of, for example, 0% to 20% by mass, with the balance being water.

Regarding the pH of the ink composition of the present invention, for the purpose of enhancing storage stability, pH 5 to 11 is preferred, and pH 7 to 10 is more preferred. Furthermore, the surface tension of the ink composition is preferably 25 mN/m to 70 mN/m, and more preferably 25 mN/m to 60 mN/m. Also, the viscosity of the ink composition is preferably 30 mPa·s or less, and more preferably 20 mPa·s or less. The pH and surface tension of the ink composition of the present invention can be appropriately adjusted with a pH-adjusting agent and a surfactant that will be described below.

The ink composition of the present invention is a product obtained by dissolving the coloring matters (I), (II), and (III) described above in water or a water-soluble organic solvent (an organic solvent miscible with water), and adding an ink modifier thereto as necessary. When this ink composition is used as an ink for inkjet recording, it is preferable to use an ink composition having a smaller content of inorganic impurities such as chlorides of metal cations (for example, sodium chloride) and sulfates of metal cations (for example, sodium sulfate) in the coloring matter (I), the coloring matter (II), and the coloring matter (III) contained in the ink composition of the present invention. The criterion of the content of inorganic impurities is approximately 1% by mass or less relative to the total mass of the coloring matters, and the lower limit may be equal to or below than the detection limit of the analytic instrument, that is, 0%. In order to produce a coloring matter having a reduced amount of inorganic impurities, desalination treatment may be carried out, for example, by the method of using a reverse-osmosis membrane; a method of stirring a dried product or wet cake of a coloring material in a mixed solvent of a (C1-C4) alcohol such as methanol and water, separating the precipitate by filtration, and drying the precipitate; or a method of performing exchange adsorption of inorganic impurities with an ion-exchange resin.

Specific examples of the water-soluble organic solvent that can be used in the preparation of the ink composition include, for example, (C1-C4) alkanols such as methanol, ethanol, propanol, isopropanol, butanol, isobutanol, secondary butanol, and tertiary butanol; carboxylic acid amides such as N,N-dimethylformamide and N,N-dimethylacetamide; lactams such as 2-pyrrolidone, N-methyl-2-pyrrolidone, and N-methylpyrrolidin-2-one; cyclic ureas such as 1,3-dimethylimidazolidin-2-one and 1,3-dimethylhexahydropyrimid-2-one; ketones or keto alcohols such as acetone, methyl ethyl ketone, and 2-methyl-2-hydroxypentan-4-one; cyclic ethers such as tetrahydrofuran and dioxane; mono-, oligo-, or poly-alkylene glycols or thioglycols having C2-C6 alkylene units, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene eglycol, polypropylene glycol, thiodiglycol, and dithiodiglycol; polyols (triols) such as glycerin and hexane-1,2,6-triol; (C1-C4) alkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; γ-butyrolactone, dimethyl sulfoxide; and the like. These organic solvents may be used singly, or two or more kinds may be used in combination.

Among these, isopropanol, N-methyl-2-pyrrolidone, glycerin, butyl carbitol, and the like are preferred.

Examples of ink modifiers that are appropriately used in the preparation of the ink composition of the present invention include a preservative and fungicide, a pH-adjusting agent, a chelating agent, an antirusting agent, a water-soluble ultraviolet absorber, a water-soluble polymer compound, a coloring matter-solubilizing agent, an antioxidant, and a surfactant. These ink modifiers will be explained below.

Examples of the fungicide include sodium dehydroacetate, sodium benzoate, sodium pyridinethion-1-oxide, p-hydroxybenzoic acid ethyl ester, 1,2-benzisothiazolin-3-one, and salts thereof.

Examples of the preservatives include organic sulfur-based, organic nitrogen-sulfur-based, organic halogen-based, haloarylsulfone-based, iodopropargyl-based, haloalkylthio-based, nitrile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiazine-based, anilide-based, adamantane-based, dithiocarbamate-based, bromated indanone-based, benzylbromacetate-based, inorganic salt-based compounds, and the like.

Specific examples of the organic halogen-based compounds include, for example, pentachlorophenol sodium, and specific examples of the pyridine oxide-based compounds include, for example, sodium 2-pyridinethiol-1-oxide. Specific examples of the isothiazoline-based compounds include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Other specific examples of the preservative and fungicide include anhydrous sodium acetate, sodium sorbate, sodium benzoate, and PROXEL® GXL(S) and PROXEL® XL-2 (S) manufactured by Arch Chemicals, Inc. Meanwhile, in the present invention the superscript "®" means registered trademark.

Regarding the pH-adjusting agent, any substance capable of controlling the pH of the ink to the range of, for example, 5 to 11 without exerting adverse influence on the ink that is prepared can be used. Specific examples thereof include, for example, alkanolamines such as diethanolamine, triethanolamine, and N-methyldiethanolamine; alkali-metal hydroxides such as lithium hydroxide, sodium hydroxide, and potassium hydroxide; ammonium hydroxide (aqueous ammonia); alkali-metal carbonate such as lithium carbonate, sodium carbonate, sodium hydrogen carbonate, and potassium carbonate; alkali-metal salts of organic acids such as potassium acetate; inorganic bases such as disodium phosphate and sodium silicate, and the like.

Examples of the chelating agent include disodium ethylenediaminetetraacetate, sodium nitrilotriacetate, sodium hydroxyethylethylenediaminetriacetate, sodium diethylenetriaminepentaacetate, sodium uracildiacetate, and the like.

Examples of the antirusting agent include acidic sulfurous acid salts, sodium thiosulfate, ammonium thioglycolate, diisopropylammonium nitrite, pentaerythritol tetranitrate, dicyclohexylammonium nitrite, and the like.

Examples of the water-soluble ultraviolet absorber include sulfonated benzophenone-based compounds, benzotriazole-based compounds, salicylic acid-based compounds, cinnamic acid-based compounds, and triazine-based compounds.

Examples of the water-soluble polymer compound include polyvinyl alcohol, cellulose derivatives, polyamine, polyimine, and the like.

Examples of the color-solubilizing agent include, for example, ε-caprolactam, ethylene carbonate, urea, and the like.

As the antioxidant, for example, various organic and metal complex-based discoloration preventing agents may be used. Examples of organic discoloration-preventing agents include hydroquinones, alkoxyphenols, dialkoxyphenols, phenols, anilines, amines, indanes, chromanes, alkoxyanilines, heterocycles, and the like.

Examples of the surfactant include known surfactants such as anionic, cationic, nonionic surfactants and the like.

Examples of anionic surfactants include alkylsulfonic acid salts, alkylcarboxylic acid salts, α-olefinsulfonic acid salts, polyoxyethylene alkyl ether acetic acid salts, N-acrylamino acids and salts thereof, N-acylmethyltaurine salts, alkylsulfate polyoxyalkyl ether sulfuric acid salts, alkylsulfate polyoxyethylene alkyl ether phosphoric acid salts, rosin acid soaps, castor oil sulfate ester salts, lauryl alcohol sulfate ester salts, alkylphenolic phosphate esters, alkylated phosphate esters, alkylaryl sulfonic acid salts, diethyl sulfosuccinic acid salts, diethylhexyl sulfosuccinic acid salts, dioctyl sulfosuccinic acid salts, and the like.

Examples of cationic surfactants include 2-vinylpyridine derivatives, poly-4-vinylpyridine derivatives, and the like.

Examples of amphoteric surfactants include lauryl dimethylamino acetate betaine, 2-alkyl-N-carboxymethyl-N-hydroxyethylimidazolinium betaine, coconut oil fatty acid amidopropyldimethylamino acetate betaine, polyoctylpolyaminoethylglycine, imidazoline derivatives, and the like.

Examples of nonionic surfactants include ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, and polyoxyethylene alkyl ethers; esters such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, and 3,5-dimethyl-1-hexyn-3-ol; trade name: Surfynol 104, 105, 82 and 465, Olfine STG, manufactured by Nissin Chemical Industry Co., Ltd.; and polyglycol ethers (for example, Tergitol 15-S-7 and the like manufactured by Sigma-Aldrich Co.); and the like.

The ink preparation agents described above are used singly or as mixtures.

The ink composition of the present invention is obtained by mixing the various components described above in an arbitrary order and stirring the mixture. If desired, the ink composition thus obtained may be subjected to filtration with a membrane filter or the like in order to eliminate contaminants.

Furthermore, for the purpose of carrying out fine adjustment of the hue of neutral high-quality black color with low color saturation and with no tinge to a more desired hue, the ink composition of the present invention may contain other coloring matters having various hues in addition to the coloring matter (I), the coloring matter (II), and the coloring matter (III) described above, to the extent that the effect obtainable by the present invention is not impaired.

In that case, coloring matters of black color of different hues (for example, C.I. Acid Black 1, C.I. Direct Black 22, and C.I. Direct Black 19), orange (for example, C.I. Direct Orange 17, C.I. Direct Orange 26, and C.I. Direct Orange 29, C.I. Direct Orange 39, and C.I. Direct Orange 49), brown, scarlet (for example, C.I. Direct Red 89), red (for example, C.I. Direct Red 62, C.I. Direct Red 75, C.I. Direct Red 79, C.I. Direct Red 80, C.I. Direct Red 84, C.I. Direct Red 225, C.I. Direct Red 226, C.I. Acid Red 249, and C.I. Acid Red 254), magenta (for example, C.I. Direct Red 227), violet, blue, navy, green, cyan (for example, C.I. Direct Blue 199, C.I. Acid Blue 9, and C.I. Acid Blue 249), and other colors can be incorporated and used.

The ink composition of the present invention can be used in various fields, but is suitable for aqueous writing inks, aqueous printing inks, information recording inks, and the like. It is particularly preferable to use the ink composition as an ink for inkjet recording, and the ink composition is suitably used in the inkjet recording method of the present invention that will be described below.

The inkjet recording method of the present invention will be explained. The inkjet recording method of the present invention is to perform recording by using the ink composition of the present invention as an ink, ejecting ink droplets of the ink according to recording signals, and thereby attaching the ink droplets to a record-receiving material. The ink nozzles and the like used at the time of recording are not particularly limited, and can be appropriately selected according to the purpose.

The recording method can be carried out by using a known method, for example, a charge-control system that discharges ink by utilizing an electrostatic attraction force; a drop-on-demand system (pressure-pulse system) that utilizes the vibration pressure of a piezoelectric element; an acoustic inkjet system that converts electric signals into acoustic beams, irradiates the ink with the beams, and discharges the ink by utilizing radiation pressure; and a thermal inkjet (BUBBLEJET (registered trademark)) system that heats ink to form bubbles and utilizes the pressure resulting therefrom.

Furthermore, the inkjet method also includes the use of a system that injects a large number of small-volume droplets of a low-concentration ink called photo-ink; a system that improves image quality by using plural kinds of inks having a substantially identical color but different concentrations; and a system that makes use of a colorless transparent ink.

The colored body of the present invention is a material colored by using the ink composition of the present invention, and is preferably a record-receiving material colored by using the ink composition of the present invention according to an inkjet recording method using an inkjet printer.

There are no particular limitations on the record-receiving material that can be colored, but examples thereof include communication sheets such as paper and films, fabrics and cloths (cellulose, nylon, wool, and the like), leather, and base materials for color filter. Among these, communication sheets are preferred.

Regarding these communication sheets, a sheet that has been surface treated, specifically, a base material such as paper, a synthetic paper, or a film provided with an ink-receiving layer, is preferred. The ink-receiving layer is provided by a method such as, for example, impregnating or coating the base material described above with a cationic polymer; or applying a porous white inorganic substance capable of absorbing the coloring matters in the ink, such as porous silica, an alumina sol, or a special ceramic, together with a hydrophilic polymer such as polyvinyl alcohol or polyvinylpyrrolidone, to the surface of the base material. A communication sheet provided with such an ink-receiving layer is usually called a paper for inkjet exclusive use, a film for inkjet exclusive use, a glossy paper, a glossy film, or the like.

Among the communication sheets described above, particularly a sheet coated with a porous white inorganic substance on the surface is especially suitable for the recording of photo images because such a sheet has high surface glossiness and excellent water resistance. However, it is known that images recorded on these sheets undergo significant discoloration and fading due to ozone gas. However, since the ink composition of the present invention has excellent ozone-gas resistance, the ink composition exhibits a significant effect even when used for inkjet recording on such a record-receiving material.

Representative examples of commercially available products as sheets coated with porous white inorganic substances on the surface as described above include trade names: PROFESSIONAL PHOTO PAPER, SUPER PHOTO PAPER, GLOSS GOLD, and MATTE PHOTO PAPER, all manufactured by Canon, Inc.; trade names: PHOTO PAPER CRISPIA (high gloss), PHOTO PAPER (GLOSSY), and PHOTO MATTE PAPER, all manufactured by Seiko Epson Corp.; trade name: ADVANCE PHOTO PAPER manufactured by Hewlett-Packard Japan, Ltd.; and trade name: KASSAI PHOTO FINISH PRO manufactured by Fujifilm Corp. In addition, plain paper also can be used without any problem.

In order to perform recording on a record-receiving material such as a communication sheet by the inkjet recording method of the present invention, for example, a vessel containing the ink composition described above is attached at a predetermined position of an inkjet printer, and recording may be performed on the record-receiving material by a conventional recording method.

The inkjet recording method of the present invention may use the black ink composition of the present invention and ink compositions of various known colors such as, for example, magenta, cyan, yellow, and, optionally, green, blue (or violet), and red (or orange) in combination.

The ink compositions of each color are filled in each of the vessels, respectively, and each of the vessels is loaded on prescribed position of an ink jet printer similarly to the vessel containing the black ink composition of the present invention, and used for ink jet recording.

The coloring matters contained in the ink composition of the present invention can be easily synthesized and are inexpensive. Furthermore, the coloring matters are highly soluble in media that contain water as a main component, and have excellent water solubility. Therefore, filterability by a membrane filter in the course of preparation of an ink composition is satisfactory.

The ink composition containing the compounds, or an ink prepared from the ink composition, also has excellent stability during storage and excellent discharge stability. That is, the ink composition of the present invention does not undergo solid precipitation after long-term storage, change in properties, change in hue, and the like, and has satisfactory storage stability.

Furthermore, an ink composition containing the coloring matters is suitably used for inkjet recording applications and handwriting instruments applications. When recording is performed with the ink composition of the present invention on a paper only for inkjet pringing purposes, the ink composition exhibits neutral black to gray color with no tinge on occasions of both deep color printing and light color printing, and there is no variation in the hue for different media. Furthermore, the print density of a recorded image is very high, and even when printing is performed with a high-concentration solution, no bronzing effect occurs on the image. Also, the image is excellent in various fastness properties such as moisture resistance and water resistance, and particularly in light resistance and ozone-gas resistance.

In addition, when the ink composition is used in combination with other ink compositions containing magenta, cyan, and yellow coloring matters, full-color inkjet recording of images that are excellent in various fastness properties and have excellent storage properties is enabled, and the ink composition can also be definitely used on plain paper.

As such, the ink composition of the present invention is highly useful as a black ink for inkjet recording.

EXAMPLES

Hereinafter, the present invention will be specifically described by way of Examples, but the present invention is not intended to be limited by the following Examples.

Herein, unless particularly stated otherwise, the units "parts" and "percent (%)" are on a mass basis.

Unless particularly stated otherwise, various operations such as synthesis reactions and crystallization were all carried out under stirring.

In the various formulas described below, acidic functional groups such as sulfo and carboxy are indicated in the form of free acids.

The pH values and reaction temperatures in the synthesis reactions all represent measured values in the reaction systems.

Furthermore, the maximum absorption wavelengths ($\lambda$max) of the compounds synthesized were measured in an aqueous solution at pH 7 to 8, and for the compounds thus measured, their measured values are described in the Examples.

Meanwhile, the azo compounds synthesized in the following Examples all exhibited a solubility of 100 g/liter or higher in water.

(A) Synthesis of Dyes

Example 1

(Step 1)

51.8 parts of 4-chloro-3-nitroaniline was dissolved in 60.0 parts of N-methyl-2-pyrrolidone, and 35.2 parts of acetic anhydride was added dropwise thereto over about 15 minutes. After the dropwise addition, the mixture was allowed to react for 2 hours at 40° C. to 50° C., and then the reaction liquid was added to 400 parts of water. The reaction liquid was stirred for 30 minutes at room temperature, subsequently the solid thus precipitated out was filtered, and the solid thus obtained was washed with 100 parts of water on a funnel. The solid was separated and dried, and thus 63.0 parts of the compound represented by the following formula (19) was obtained.

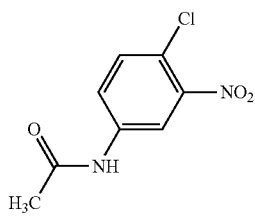

(19)

(Step 2)

42.9 parts of the compound represented by the formula (19) obtained in Example 1 (Step 1) was dissolved in 115.0 parts of N-methyl-2-pyrrolidone, and 40.9 parts of sodium 3-mercaptopropane sulfonate and 29.0 parts of potassium carbonate were added thereto. After the addition, the mixture was heated to 130° C. to 140° C., and was allowed to react for 2 hours at the same temperature. 3.6 parts of sodium 3-mercaptopropanesulfonate was further added thereto, and then the mixture was allowed to react for 1 hour at 130° C. to 140° C. The reaction mixture was cooled to 60° C., and then the reaction liquid was added to 700 parts of 2-propanol. The mixture was cooled to room temperature, and then the solid thus obtained was separated by filtration. The wet cake thus obtained was dissolved in 300 parts of water, and the solution was adjusted to pH 3.0 to 4.0 by adding 35% hydrochloric acid thereto. Subsequently, salting-out was carried out by using sodium chloride, the solid thus precipitated out was separated by filtration, and thus 205.3 parts of the compound represented by the following formula (20) was obtained as wet cake.

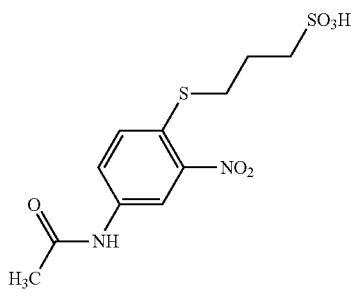

(20)

(Step 3)

102.6 parts of the wet cake of the compound represented by the formula (20) obtained in Example 1 (Step 2), 1.6 parts of activated charcoal, and 0.4 parts of anhydrous iron(III) chloride were added to 150 parts of water, the mixture was heated to 60° C., and then 15.9 parts of 80% hydrazine hydrate was added dropwise thereto over about 30 minutes. The mixture was heated to 90° C., and then the mixture was allowed to react for 1.5 hours at the same temperature. The mixture was cooled to 40° C., subsequently insoluble matters were removed by filtration, and the filtrate was cooled to room temperature. The filtrate was adjusted to pH 1.0 to 1.5 by adding 50% sulfuric acid, the solid thus precipitated out was separated by filtration, and thus 62.3 parts of the compound represented by the following formula (21) was obtained as wet cake.

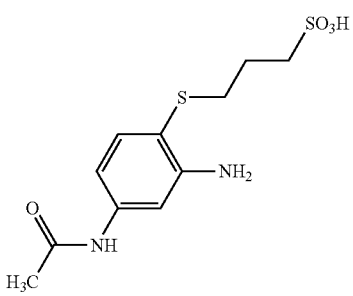

(21)

(Step 4)

12.6 parts of 5-amino-2-chlorobenzenesulfonic acid represented by the following formula (22) was added to 40 parts of water, and then a 25% aqueous solution of sodium hydroxide was added thereto to obtain an aqueous solution at pH 4.0 to 5.0. 25 parts of 35% hydrochloric acid was added thereto, subsequently 12.6 parts of a 40% aqueous solution of sodium nitrite was added thereto, and the mixture was allowed to react for about 30 minutes. To this, 1.5 parts of sulfamic acid was added, subsequently the mixture was stirred for 5 minutes, and thus a diazo reaction liquid was obtained.

On the other hand, 32.4 parts of the wet cake of the compound represented by the formula (21) obtained in Example 1 (Step 3) was added to 200 parts of water, and then a 25% aqueous solution of sodium hydroxide was added thereto to obtain an aqueous solution at pH 4.0 to 5.0. This aqueous solution was added dropwise to the diazo reaction liquid obtained as described above, over about 5 minutes. After the dropwise addition, while the pH was maintained at 2.0 to 2.5 by adding a 15% aqueous solution of sodium carbonate, the mixture was allowed to react for 3 hours, and then the mixture was subjected to salting-out by adding sodium chloride. The solid thus precipitated out was separated by filtration, and thus 31.5 parts of the compound represented by the following formula (23) was obtained as wet cake.

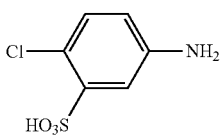

(22)

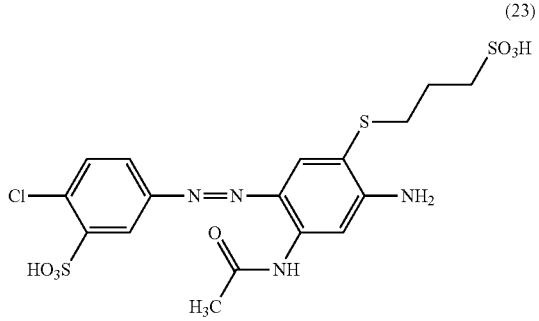

(23)

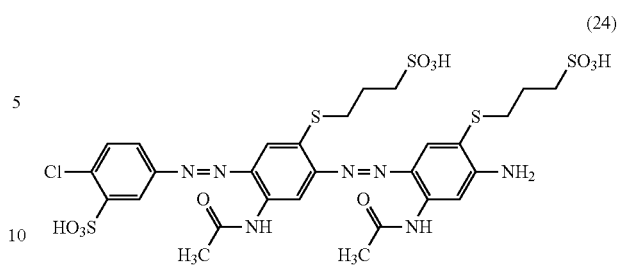

(24)

(Step 5)

The entire amount of the wet cake of the compound represented by the formula (23) obtained in Example 1 (Step 4) was added to 40 parts of water, and then a 25% aqueous solution of sodium hydroxide was added thereto to obtain an aqueous solution at pH 6.0 to 7.0. 24.8 parts of 35% hydrochloric acid was added thereto, subsequently 9.8 parts of a 40% aqueous solution of sodium nitrite was added thereto, and the mixture was allowed to react for about 30 minutes. 2.0 parts of sulfamic acid was added thereto, the mixture was stirred for 5 minutes, and thus a diazo reaction liquid was obtained.

On the other hand, 30.8 parts of the wet cake of the compound represented by the formula (21) obtained in Example 1 (Step 3) was added to 250 parts of water, and then a 25% aqueous solution of sodium hydroxide was added thereto to obtain an aqueous solution at pH 4.0 to 5.0. This aqueous solution was added dropwise over about 5 minutes to the diazo reaction liquid obtained as described above. After the dropwise addition, while the pH was maintained at 2.0 to 2.5 by adding a 15% aqueous solution of sodium carbonate, the mixture was allowed to react for 3 hours, and then the mixture was subjected to salting-out by adding sodium chloride. The solid thus precipitated out was separated by filtration, and thus 90 parts of the compound represented by the following formula (24) was obtained as wet cake.

(Step 6)

45 parts of wet cake of the compound represented by the formula (23) obtained in Example 1 (Step 4) was added to 250 parts of water, and the mixture was dissolved by stirring. 16.5 parts of 35% hydrochloric acid was added thereto, subsequently 4.7 parts of a 40% aqueous solution of sodium nitrite was added thereto, and the mixture was stirred for about 30 minutes. To this, 2.0 parts of sulfamic acid was added, the mixture was stirred for 5 minutes, and thus a diazo reaction liquid was obtained.

On the other hand, 5.5 parts of the compound represented by the following formula (25) that is obtainable by the method described in Japanese Unexamined Patent Application Publication No. 2004-083492 was added to 60 parts of water, and a 25% aqueous solution of sodium hydroxide was added thereto to obtain an aqueous solution at pH 4.5 to 5.5. This aqueous solution was added dropwise over about 5 minutes to the diazo reaction liquid obtained as described above. After the dropwise addition, while the pH was maintained at 2.0 to 3.0 by adding a 15% aqueous solution of sodium carbonate, the mixture was allowed to react for 3 hours. The pH was adjusted to 4.5 by adding a 15% aqueous solution of sodium carbonate, and then 350 parts of methanol was added thereto. The solid thus precipitated out was separated by filtration, and thus 96.6 parts of the compound represented by the following formula (26) was obtained as wet cake.

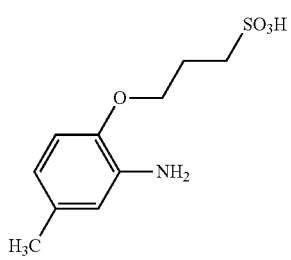

(25)

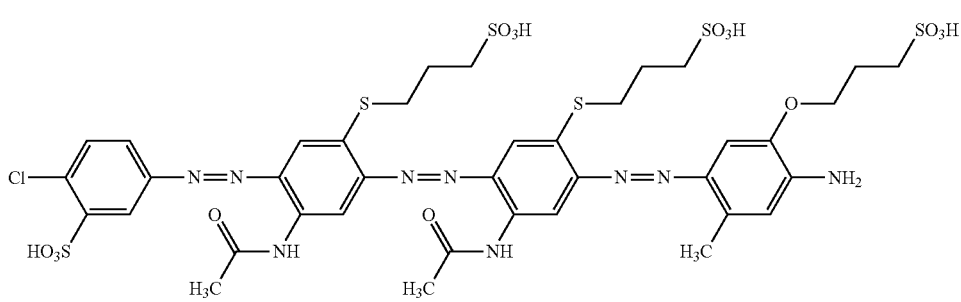

(26)

(Step 7)

32.2 parts of the wet cake of the compound represented by the formula (26) obtained in Example 1 (Step 6) was added to 170 parts of water, and the mixture was dissolved by stirring. 5.2 parts of 35% hydrochloric acid was added thereto, subsequently 1.5 parts of a 40% aqueous solution of sodium nitrite was added thereto, and the mixture was stirred for about 30 minutes. To this, 1.0 part of sulfamic acid was added, the mixture was stirred for 5 minutes, and thus a diazo reaction liquid was obtained.

On the other hand, 2.2 parts of the compound represented by the following formula (27) obtained by the method described in Patent Document 1 was added to 60 parts of water, and a 25% aqueous solution of sodium hydroxide was added thereto to obtain an aqueous solution at pH 7.5 to 8.5. To this aqueous solution, the diazo reaction liquid obtained as described above was added dropwise over about 30 minutes at 15° C. to 30° C. At this time, the pH of the reaction liquid was maintained at 7.5 to 8.5 by adding an aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 29.5 parts of wet cake was obtained. The wet cake thus obtained was dissolved in 100 parts of water, and the pH was adjusted to 7.0 to 7.5 with 35% hydrochloric acid. Subsequently, 80 parts of methanol was added thereto, and the solid thus precipitated out was separated by filtration. The wet cake thus obtained was dissolved again in 60 parts of water, and then 90 parts of methanol was added thereto. The solid thus precipitated out was separated by filtration and dried, and thereby, 6.3 parts of the compound represented by the following formula (28) of the present invention was obtained as a sodium salt. λmax: 589 nm.

Example 2

Sodium salt of 6.3 parts of the compound represented by the formula (28) obtained in Example 1, and 14 parts of lithium chloride were added to 140 parts of water, and an aqueous solution was obtained by stirring the mixture. 400 parts of 2-propanol was added thereto, the solid thus precipitated out was separated by filtration, and thus wet cake was obtained. The wet cake thus obtained and 12.5 parts of lithium chloride were added to 150 parts of water again, and the mixture was stirred to obtain an aqueous solution. 350 parts of 2-propanol was added thereto, the solid thus precipitated out was separated by filtration, and thus wet cake was obtained. The wet cake thus obtained was dissolved in 80 parts of water, and 150 parts of 2-propanol was added thereto. The solid thus precipitated out was separated by filtration, and thus wet cake was obtained. The wet cake thus obtained was dissolved again in 40 parts of water, 100 parts of 2-propanol was added thereto, and the solid thus precipitated out was separated by filtration and dried.

Thereby, 4.5 parts of the compound represented by formula (28) of the present invention was obtained as a mixed salt with sodium and lithium. λmax: 586 nm.

Example 3

(Step 1)

15.2 parts of 2-methyl-6-nitroaniline was dissolved in 300 parts of methanol. The solution thus obtained was transferred into an autoclave, 2.0 parts of 5% Pd/carbon was added thereto, and the mixture was allowed to react at 20° C. to 30° C. at a hydrogen pressure of 0.2 MPa to 0.5 MPa, until the absorption of hydrogen had run its course. Thereafter, the reaction was continued for another 30 minutes at the same temperature. The catalyst (5% Pd/carbon) was separated by filtration, and thereby, a solution (filtrate) containing the compound represented by the following formula (29) was obtained.

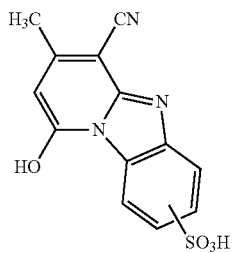

(27)

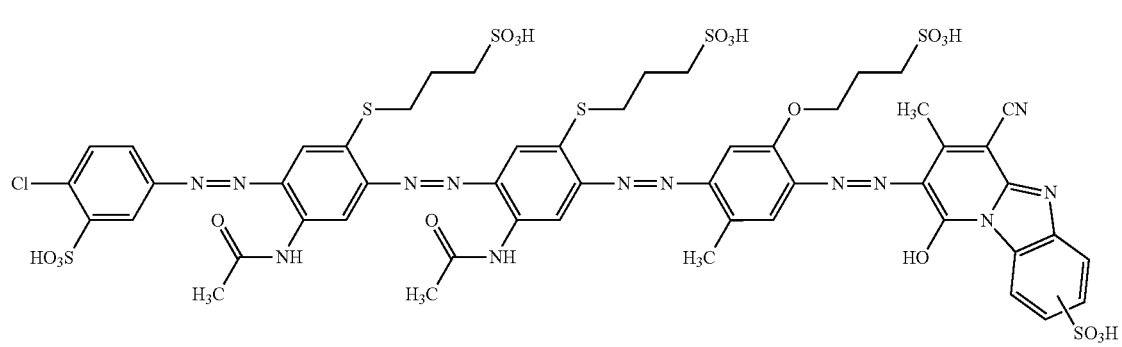

(28)

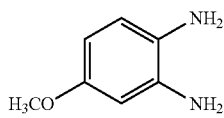

(29)

(Step 2)

13.0 parts of methyl cyanoacetate was added to 200 parts of a solution containing the compound represented by the formula (29) obtained in Example 3 (Step 1), and the mixture was heated to reflux for 30 minutes. Subsequently, methanol was concentrated under reduced pressure, and 100 parts of water was added thereto, followed by sodium carbonate to adjust the pH 7.0 to 7.5. The solid thus precipitated out was separated by filtration and dried, and thereby 8.3 parts of the compound represented by the following formula (30) was obtained.

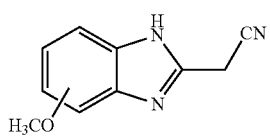

(30)

(Step 3)

8.3 parts of the compound represented by the formula (30), 12.0 parts of 28% sodium methoxide, and 7.2 parts of methyl acetoacetate were added to 100 parts of ethanol, and the mixture was heated to reflux for 30 minutes. Subsequently, ethanol was concentrated under reduced pressure, and 100 parts of water was added thereto, followed by 35% hydrochloric acid to adjust the pH 7.0 to 7.5. The solid thus precipitated out was separated by filtration and dried, and thereby 11.1 parts of the compound represented by the following formula (31) was obtained. The compound represented by the following formula (31) and thus obtained was a mixture of compounds in which the methoxy group was substituted at position b or c.

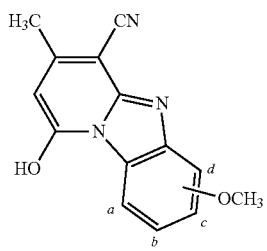

(31)

(Step 4)

5.6 parts of the compound represented by the formula (31) was slowly added to 77 parts of 8% fuming sulfuric acid at 5° C. to 10° C., and then the mixture was allowed to react for 1.5 hours at the same temperature. The reaction liquid was added dropwise to 150 parts of ice water over about 10 minutes, the mixture was stirred for 30 minutes at 65° C. to 70° C., and then the solid thus precipitated out was separated by filtration. Thereby, 24.4 parts of wet cake of the compound represented by the following formula (32) was obtained. The compound represented by the following formula (32) was a mixture of compounds in which the methoxy group was substituted at position b and the substitution position of the sulfo group was a, c, or d, or in which the methoxy group was substituted at position c and the substitution position of the sulfo group was a, b, or d.

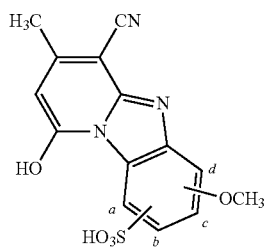

(32)

(Step 5)

The operation was carried out in the same manner as in Example 1 (Step 7), except that 7.2 parts of the wet cake of the compound represented by the formula (32) obtained in Example 3 (Step 4) was used instead of using 2.2 parts of the compound represented by the formula (27) used in Example 1 (Step 7), and thereby 6.3 parts of the compound represented by the following formula (33) of the present invention was obtained as a sodium salt. The coloring matter thus obtained was a mixed coloring matter including 2 to 6 kinds of compounds in which the methoxy group in the following formula (33) was substituted at position b and the substitution position of the sulfo group was a, c, or d, or in which the methoxy group was substituted at position c and the substitution position of the sulfo group was a, b, or d.

(33)

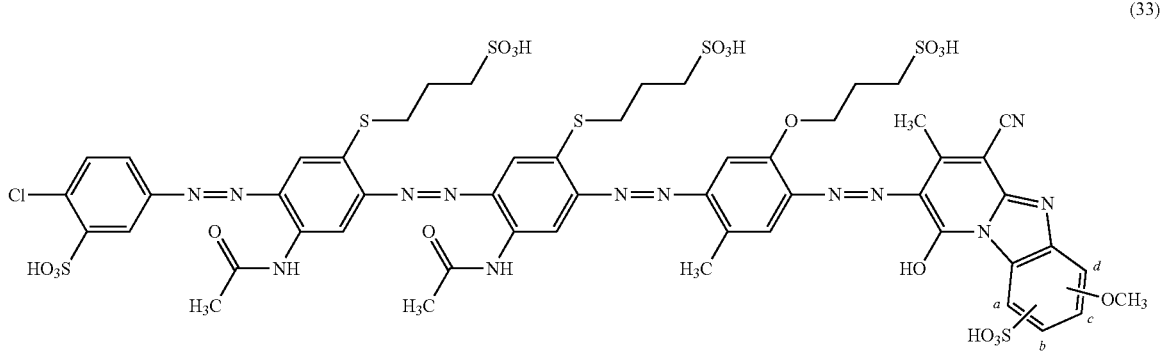

Example 4

The operation was carried out in the same manner as in Example 2, except that 8.8 parts of the sodium salt of the compound represented by the formula (33) obtained in Example 3 (Step 5) was used instead of using 6.3 parts of the sodium salt of the compound represented by the formula (28), and thereby 4.5 parts of the compound represented by the formula (33) of the present invention was obtained as a mixed salt with sodium and lithium. λmax: 592 nm.

Example 5

(Step 1)

15.2 parts of 2-methyl-6-nitroaniline was dissolved in 300 parts of methanol. The solution thus obtained was transferred into an autoclave, 2.0 parts of 5% Pd/carbon was added thereto, and the mixture was allowed to react at 20° C. to 30° C. and at hydrogen pressure of 0.2 MPa to 0.5 MPa under stirring, until the absorption of hydrogen had run its course. Thereafter, the reaction was continued for another 30 minutes at the same temperature. The catalyst (5% Pd/carbon) was separated by filtration, and thereby a solution (filtrate) containing the compound represented by the following formula (34) was obtained.

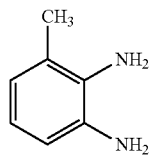

(34)

(Step 2)

13.0 parts of the compound represented by the following formula (35) was added to 200 parts of solution containing the compound represented by the formula (34), and the mixture was heated to reflux for 30 minutes under stirring. Subsequently, the reaction liquid was concentrated under reduced pressure, and 150 parts of water was added thereto, followed by sodium carbonate to adjust the pH 7.0 to 7.5. The solid thus precipitated out was separated by filtration and dried, and thereby 8.4 parts of the compound represented by the following formula (36) was obtained. Meanwhile, the compound represented by the following formula (35) was obtained by a method described in Patent Document 5.

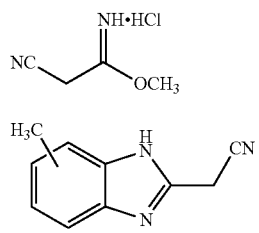

(35)

(36)

(Step 3)

8.4 parts of the compound represented by formula (36), 12.3 parts of 28% sodium methoxide, and then 7.4 parts of methyl acetoacetate were added to 100 parts of ethanol, and the mixture was heated to reflux for 30 minutes. Subsequently, ethanol was concentrated under reduced pressure, and 150 parts of water was added thereto, followed by 35% hydrochloric acid to adjust the pH 7.0 to 7.5. The solid thus precipitated out was separated by filtration and dried, and thereby 10.0 parts of the compound represented by the following formula (37) was obtained. The compound represented by the following formula (37) was a compound in which the methyl group was substituted at position a or d.

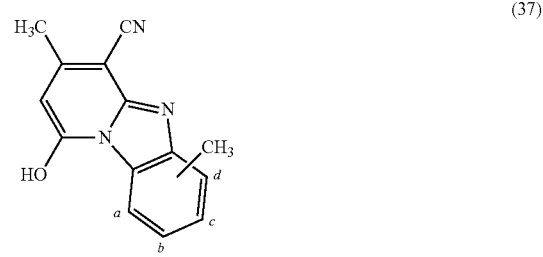

(37)

(Step 4)

5.0 parts of the compound represented by the formula (37) was slowly added to 102 parts of 3% fuming sulfuric acid at 5° C. to 10° C., and then the mixture as stirred for 1 hour at the same temperature. The reaction liquid was added dropwise to 240 parts of ice water over about 10 minutes, and the solid thus precipitated out was separated by filtration. Thereby 14.7 parts of wet cake containing the compound represented by the following formula (38) was obtained. The compound represented by the following formula (38) was either a compound in which the methyl group was substituted at position a and the substitution position of the sulfo group was c, or a compound in which the methyl group was substituted at position d and the substitution position of the sulfo group was b.

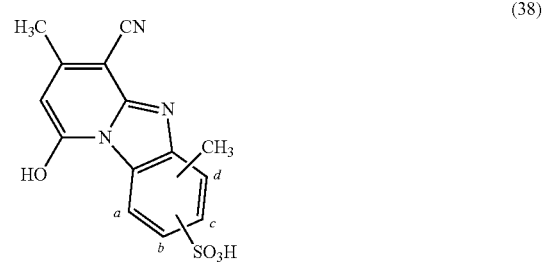

(38)

(Step 5)

The operation was carried out in the same manner as in Example 1 (Step 7), except that 6.0 parts of the wet cake of the compound represented by the formula (38) obtained in Example 5 (Step 4) was used instead of using 2.2 parts of the compound represented by the formula (27), and thus 6.0 parts of the compound represented by the following formula (39) of the present invention was obtained as a sodium salt. The coloring matter thus obtained was a mixed coloring matter including 2 to 6 kinds of compounds in which the methoxy group in the following formula (39) was substituted at position b and the substitution position of the sulfo group was a, c, or d, or in which the methoxy group was substituted at position c and the substitution position of the sulfo group was a, b, or d.

(39)

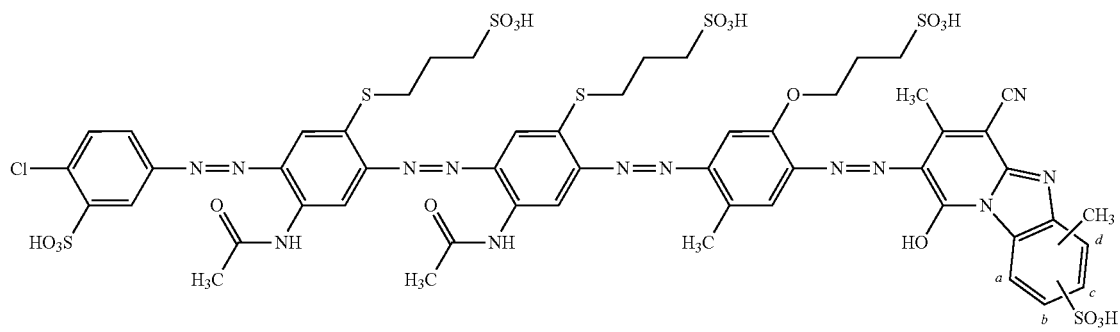

Example 6

The operation was carried out in the same manner as in Example 2, except that 8.8 parts of the sodium salt of the compound represented by the formula (39) obtained in Example 5 (Step 5) was used instead of using 6.3 parts of the sodium salt of the compound represented by the formula (28), and thus 4.0 parts of the compound represented by the formula (39) of the present invention was obtained as a mixed salt with sodium and lithium. λmax: 590 nm.

Example 7

(Step 1)

45 parts of the wet cake of the compound represented by the formula (23) obtained in Example 1 (Step 4) was added to 250 parts of water, and the mixture was dissolved by stirring.

16.5 parts of 35% hydrochloric acid was added thereto, subsequently 4.7 parts of a 40% aqueous solution of sodium nitrite was added thereto, and the mixture was stirred for about 30 minutes. To this, 2.0 parts of sulfamic acid was added, the mixture was stirred for 5 minutes, and thus a diazo reaction liquid was obtained.

On the other hand, 5.8 parts of the compound represented by formula (40) that is obtainable by the method described in Japanese Unexamined Patent Application Publication No. 2004-083492 was added to 60 parts of water, a 25% aqueous solution of sodium hydroxide was added thereto to obtain an aqueous solution at pH 4.5 to 5.5. This aqueous solution was added dropwise to the diazo reaction liquid obtained as described above over about 5 minutes. After the dropwise addition, while the pH was maintained at 2.0 to 3.0 by adding a 15% aqueous solution of sodium carbonate, the mixture was allowed to react for 3 hours. The pH was adjusted to 4.5 by adding a 15% aqueous solution of sodium carbonate, and then 350 parts of methanol was added thereto. The solid thus precipitated out was separated by filtration, and thus 94.0 parts of the compound represented by the following formula (41) was obtained as wet cake.

(40)

(41)

(Step 2)

31.3 parts of the wet cake of the compound represented by the formula (41) obtained in Example 7 (Step 1) was added to 170 parts of water, and the mixture was dissolved by stirring. 5.2 parts of 35% hydrochloric acid was added thereto, subsequently 1.5 parts of a 40% aqueous solution of sodium nitrite was added thereto, and the mixture was stirred for about 30 minutes. To this, 1.0 part of sulfamic acid was added, the mixture was stirred for 5 minutes, and thus a diazo reaction liquid was obtained.

On the other hand, 2.2 parts of the compound represented by the formula (27) obtained by the method described in Patent Document 1 was added to 60 parts of water, a 25% aqueous solution of sodium hydroxide was added thereto to obtain an aqueous solution at pH 7.5 to 8.5. To this aqueous solution, the diazo reaction liquid obtained as described above was added dropwise over about 30 minutes at 15° C. to 30° C. At this time, the pH of the reaction liquid was maintained at 7.5 to 8.5 by adding an aqueous solution of sodium carbonate, and while the same temperature and pH adjustment were maintained, the reaction liquid was allowed to react for another 2 hours. Sodium chloride was added to the reaction liquid to salt out, the solid thus precipitated out was separated by filtration, and thus 30.0 parts of wet cake was obtained. The wet cake thus obtained was dissolved in 100 parts of water, and the pH was adjusted to 7.0 to 7.5 with 35% hydrochloric acid. Subsequently, 80 parts of methanol was added thereto, and the solid thus precipitated out was separated by filtration. The wet cake thus obtained was dissolved again in 60 parts of water, and then 90 parts of methanol was added thereto. The solid thus precipitated out was separated by filtration and dried, and thereby 6.0 parts of the compound represented by the following formula (42) of the present invention was obtained as a sodium salt.

out was separated by filtration. Thus, wet cake was obtained. The wet cake thus obtained and 12.5 parts of lithium chloride were added to 150 parts of water again, and the mixture was stirred to obtain an aqueous solution. 350 parts of 2-propanol was added thereto, the solid thus precipitated out was separated by filtration, and thus wet cake was obtained. The wet cake thus obtained was dissolved in 80 parts of water, and 150 parts of 2-propanol was added thereto. The solid thus precipitated out was separated by filtration, and thus wet cake was obtained. The wet cake thus obtained was dissolved again in 40 parts of water, 100 parts of 2-propanol was added thereto, and the solid thus precipitated out was separated by filtration and dried. Thereby, 4.3 parts of the compound represented by the formula (42) of the present invention was obtained as a mixed salt with sodium and lithium. λmax: 590 nm.

Example 9

The operation was carried out in the same manner as in Example 1 (Step 7), except that 7.2 parts of the wet cake of the compound represented by the formula (32) obtained in Example 3 (Step 4) was used instead of using 2.2 parts of the compound represented by the formula (27), and thus 5.6 parts of the compound represented by the following formula (43) of the present invention was obtained as a sodium salt. The (42)

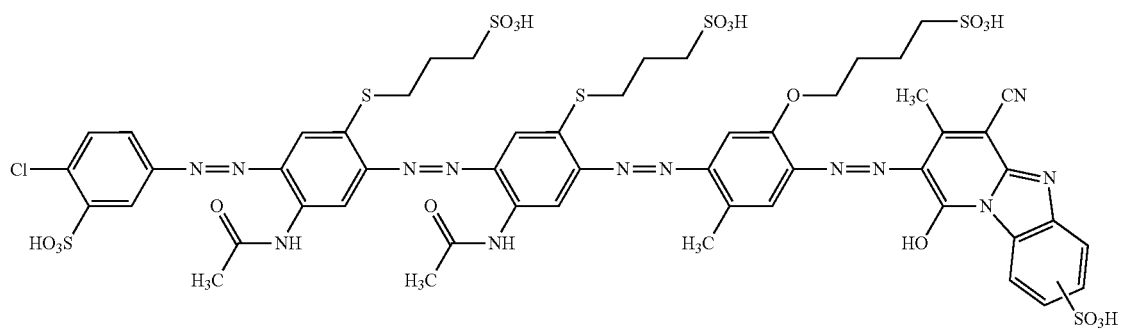

Example 8

Sodium salt of 6.0 parts of the compound represented by the formula (42) obtained in Example 7 and 14 parts of lithium chloride were added to 140 parts of water, and the mixture was stirred to obtain an aqueous solution. 400 parts of 2-propanol was added thereto, and the solid thus precipitated coloring matter thus obtained was a mixed coloring matter including 2 to 6 kinds of compounds in which the methoxy group in the following formula (43) was substituted at position b and the substitution position of the sulfo group was a, c, or d, or in which the methoxy group was substituted at position c and the substitution position of the sulfo group was a, b, or d.

(43)

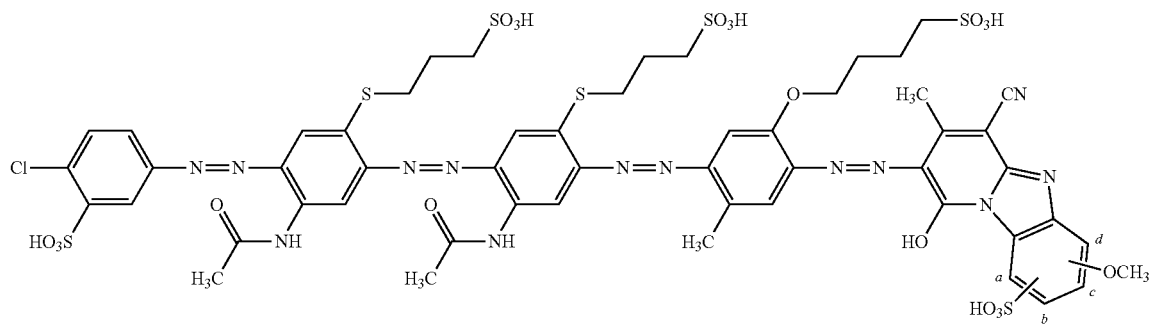

Example 10

The same operation was carried out in the same manner as in Example 7, except that 5.6 parts of the sodium salt of the compound represented by the formula (43) obtained in Example 9 described above was used instead of using 6.0 parts of the sodium salt of the compound represented by the formula (42), and thus 4.0 parts of the compound represented by the formula (43) of the present invention was obtained as a mixed salt with sodium and lithium. $\lambda$max: 597 nm.

The coloring matters obtained in Examples 1 to 10 were respectively dissolved in ion-exchanged water, and liquids in which 5% of each of the coloring matters was dissolved in water were prepared. The solutions thus obtained were placed in sealed containers and were left to stand for 1 week in a constant-temperature, constant-humidity chamber at 60° C.; however, decomposition of the coloring matters did not occur.

(B) Preparation of Inks

The various dyes obtained in Examples 2, 4, and 10 were respectively mixed with the various components described in the following Table 18 according to the number of parts indicated therein, and thereby black ink compositions of the present invention were obtained. Subsequently, contaminants were separated by filtration by using a 0.45-μm membrane filter, and the ink compositions thus obtained were designated as Examples 11 to 14, respectively. The ink compositions thus obtained will be hereinafter referred to as "inks". Furthermore, in Table 18, the columns for the coloring matter and the black dye are respectively partitioned by a broken line into an upper row and a lower row, and the formula number of the compound in the Examples and Comparative Examples is described in the upper row, while the number of parts used is described in the lower row. Furthermore, the compounds of Examples 2, 4, and 10 are described in Table 18 as the formula (28), the formula (33), and the formula (43), respectively; however, since the operations of the respective Examples were carried out, the compounds were actually mixed salts with sodium and lithium. Also, the symbol "—" means that the composition does not contain the corresponding component. Furthermore, as for water, ion-exchanged water was used. At the time of ink formulation, the pH of the inks was adjusted to pH 7 to 9 with lithium hydroxide, and thereafter, the total amount was adjusted to 100 parts by adding ion-exchanged water. Meanwhile, regarding the surfactant indicated in the following Table 18, trade name: Surfynol 104PG50 manufactured by Nissin Chemical Industry Co., Ltd. was used.

The inks of Comparative Examples 1 to 7 were obtained by mixing the various components described in the following Table 18. Meanwhile, preparation of the inks for Comparative Examples was carried out by the same operation as that used for the preparation of the inks for Examples.

TABLE 18

| | Example 11 | Example 12 | Example 13 | Example 14 |
|---|---|---|---|---|
| Coloring matter (I) | Formula (28) 3.6 | Formula (33) 4 | Formula (33) 3.8 | Formula (43) 4 |
| Coloring matter (II) | Formula (14) 1.25 | Formula (14) 0.3 | Formula (14) 0.3 | Formula (14) 0.3 |
| Coloring matter (III) | Formula (17) 0.15 | Formula (17) 0.7 | Formula (17) 0.9 | Formula (17) 0.7 |
| Black dye | — | — | — | — |
| Black dye | — | — | — | — |
| Urea | 5 | 5 | 5 | 5 |
| Glycerin | 5 | 5 | 5 | 5 |
| N-methyl-2-pyrrolidone | 4 | 4 | 4 | 4 |
| Isopropyl alcohol | 3 | 3 | 3 | 3 |
| Butyl carbitol | 2 | 2 | 2 | 2 |
| Taurine | 0.3 | 0.3 | 0.3 | 0.3 |
| Ethylenediamine tetraacetic acid disodium | 0.1 | 0.1 | 0.1 | 0.1 |
| Surfactant | 0.1 | 0.1 | 0.1 | 0.1 |
| Water | 75.5 | 75.5 | 75.5 | 75.5 |
| Total | 100 | 100 | 100 | 100 |

| | Comparative Example 1 | Comparative Example 2 | Comparative Example 3 | Comparative Example 4 |
|---|---|---|---|---|
| Coloring matter (I) | — | — | Formula (28) 3.5 | Formula (33) 3.5 |
| Coloring matter (II) | Formula (14) 1.35 | Formula (14) 1 | — | — |
| Coloring matter (III) | — | — | — | — |
| Black dye | Formula (44) 2.35 | Formula (46) 4 | — | — |
| Black dye | Formula (45) 1.3 | — | — | — |
| Urea | 5 | 5 | 5 | 5 |
| Glycerin | 5 | 5 | 5 | 5 |
| N-methyl-2-pyrrolidone | 4 | 4 | 4 | 4 |
| Isopropyl alcohol | 3 | 3 | 3 | 3 |
| Butyl carbitol | 2 | 2 | 2 | 2 |
| Taurine | 0.3 | 0.3 | 0.3 | 0.3 |
| Ethylenediamine tetraacetic acid disodium | 0.1 | 0.1 | 0.1 | 0.1 |
| Surfactant | 0.1 | 0.1 | 0.1 | 0.1 |
| Water | 75.5 | 75.5 | 77 | 77 |
| Total | 100 | 100 | 100 | 100 |

| | Comparative Example 5 | Comparative Example 6 | Comparative Example 7 |
|---|---|---|---|
| Coloring matter (I) | Formula (43) 3.5 | — | — |
| Coloring matter (II) | — | Formula (14) 3.5 | — |
| Coloring matter (III) | — | — | Formula (17) 3.5 |
| Black dye | — | — | — |
| Black dye | — | — | — |
| Urea | 5 | 5 | 5 |
| Glycerin | 5 | 5 | 5 |
| N-methyl-2-pyrrolidone | 4 | 4 | 4 |
| Isopropyl alcohol | 3 | 3 | 3 |
| Butyl carbitol | 2 | 2 | 2 |
| Taurine | 0.3 | 0.3 | 0.3 |
| Ethylenediamine tetraacetic acid disodium | 0.1 | 0.1 | 0.1 |
| Surfactant | 0.1 | 0.1 | 0.1 |
| Water | 77 | 77 | 77 |
| Total | 100 | 100 | 100 |

The coloring matter (II) represented by the formula (14) in Table 18 was obtained by reattempting the Synthesis Example described in Patent Document 3.

The coloring matter (III) represented by the formula (17) in Table 18 was obtained by reattempting the Synthesis Example described in Patent Document 4.

Comparative Example 1

An ink that used the coloring matters disclosed in Example 2 of WO 2007/077931 as black coloring matters for comparison was prepared, and this was designated as an ink of Comparative Example 1. These coloring matters were obtained by reattempting the synthesis methods described in the patent. The structures of the coloring matters (44) and (45) used in the ink of Comparative Example 1 are presented below.

(C) Inkjet Recording

Inkjet recording was performed on glossy papers 1 and 2 described below, by using the inks obtained as described above and by using an inkjet printer manufactured by Canon, Inc., trade name: PIXUS iP4500.

Glossy paper 1: glossy paper manufactured by Canon, Inc., trade name: PHOTO PAPER GLOSSY GOLD [GL-101A4100]

Glossy paper 2: glossy paper manufactured by Canon, Inc., trade name: PHOTO PAPER GLOSSY PRO [PT-101A420]

At the time of printing, image patterns were produced so as to obtain gradation of six levels at densities of 100%, 80%,

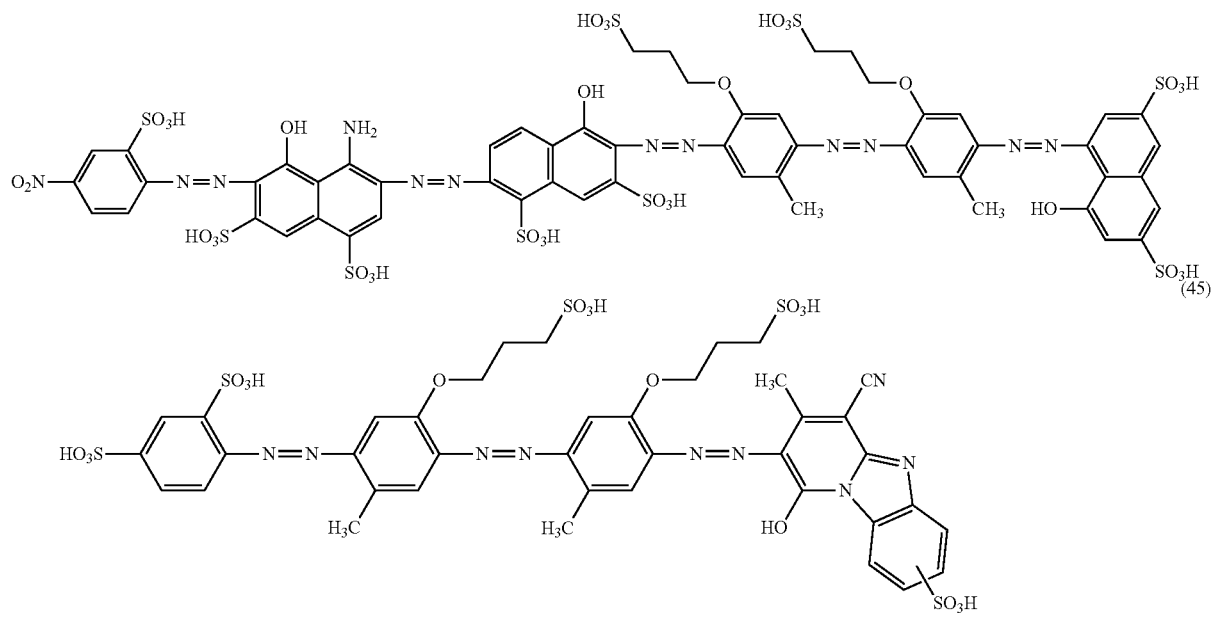

Comparative Example 2

An ink that used the coloring matters disclosed in Example 1 of Japanese Unexamined Patent Application Publication No. 2009-185133 as black coloring matters for comparison was prepared, and this was designated as an ink of Comparative Example 2. These coloring matters were obtained by reattempting the synthesis methods described in the patent. The structure of coloring matter (46) used in the ink of Comparative Example 2 is presented below.

60%, 40%, 20%, and 10%, and recorded materials with gradation from dark black to light black were obtained. The following evaluation tests were carried out by using these as specimens.

(D) Evaluation of Recorded Images

The respective recorded images obtained by using the inks of Examples 11 to 14 and Comparative Examples 1 to 7 were evaluated by measuring the density change in the images before and after the test.

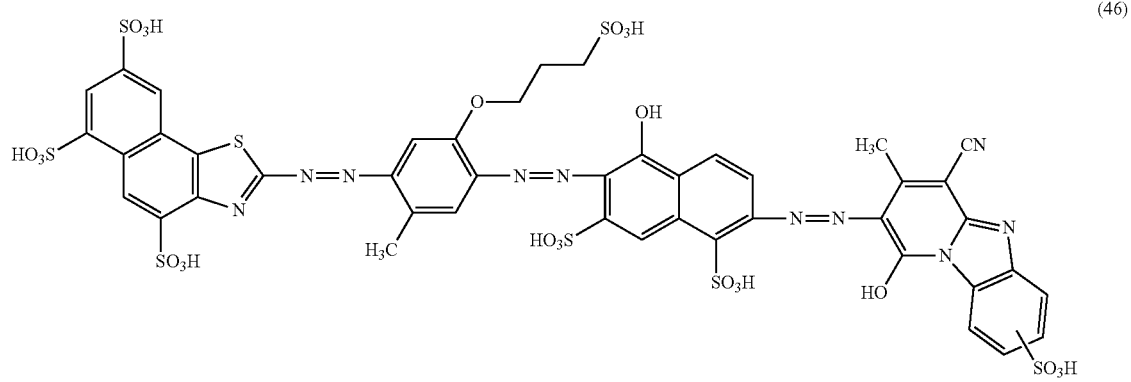

The density change in a recorded image was measured by measuring the color of a gradation part in which the reflected density, Dk value, of the recorded image before the test was closest to 1.0, by using a colorimeter manufactured by Gretag-Macbeth GmbH, trade name: SPECTROEYE. All the colorimetric measurements were made by using DIN as a density standard, under the conditions of a 2° viewing angle and a D65 light source. In the ozone-gas resistance test, a fastness-properties test was carried out in the gradation area in which the reflected density before the test was closest to 1.0. Specific test methods are as follows.

(E) Print-Density Evaluation

For a gradation part where the image that had been inkjet-recorded on glossy paper 2 was printed at the darkest density, that is, a gradation area at a density of 100%, the black reflection density, Dk value, was measured by using the colorimetric system described above. The values were evaluated on the basis of the following criteria. The evaluation results are presented in Table 19. A higher Dk value indicates a higher print density, which is excellent.

A: Having a Dk value of 2.20 or more
B: Having a Dk value less than 2.20 and greater than or equal to 2.00
C: Having a Dk value less than 2.00 and greater than or equal to 1.80
D: Having a Dk value less than 1.80

(F) Color-Saturation Test

In order to evaluate the quality of the black hue of the images that had been inkjet-recorded on glossy paper 2, the chroma C* value was evaluated. When the evaluation was carried out, the L*, a*, and b* of the CIL were measured by using the colorimetric system, and the chroma was calculated by using the following formula.

$$C^* = (a^{*2} + b^{*2})^{1/2}$$

The test results were evaluated on the basis of the following criteria. The evaluation results are presented in Table 19. A smaller C* value (close to 0) gives a color closer to an achromatic high-quality black color with no tinge, which is excellent.

A: Having a C* value less than 5
B: Having a C* value greater than or equal to 5 and less than 8
C: Having a C* value greater than or equal to 8 and less than 10
D: Having a C* value greater than or equal to 10

TABLE 19

|  | (E) Print density | (F) Chroma |
|---|---|---|
|  | Dk | C* |
| Example 11 | A | B |
| Example 12 | A | A |
| Example 13 | A | A |
| Example 14 | A | A |
| Comparative Example 1 | A | A |
| Comparative Example 2 | B | C |
| Comparative Example 3 | C | D |
| Comparative Example 4 | C | D |
| Comparative Example 5 | C | D |
| Comparative Example 6 | D | D |
| Comparative Example 7 | D | D |

As is obvious from the results of Table 19, it was clearly shown that the inks of the respective Examples had superior print densities and excellent hues, as compared with the inks of Comparative Examples 2 to 7. That is, it was clearly shown that since the inks of the respective Examples had the coloring matter (II), the coloring matter (II) and the coloring (III) incorporated therein, high-quality black images that were achromatic and had high densities were obtained. Furthermore, even if compared with the ink of Comparative Example 2, it was obvious that the density was high.

(G) Ozone-gas Resistance Test

The respective recorded images obtained by using the inks of Examples 11 to 14 and Comparative Examples 1 to 5 were naturally dried for 24 hours after printing, and the respective specimens were left to stand for 8 hours under conditions of an ozone-gas concentration of 40 ppm, a humidity of 60% RH, and a temperature of 24° C., by using trade name: OZONE WEATHER-O-METER manufactured by Suga Test Instruments Co., Ltd. After completion of the test, the color was measured by using the aforementioned colorimeter, and the residual ratio of coloring matter was determined from the formula: (reflected density Dk after test/reflected density Dk before test)×100(%). Thus, an evaluation was carried out on the basis of the following criteria. In the evaluation thus obtained, a specimen having a higher residual ratio exhibited less fading caused by ozone gas, which was considered superior. The results are presented in the following Table 20.

A: Having a residual ratio of 95% or higher
B: Having a residual ratio equal to or higher than 90% and less than 95%
C: Having a residual ratio equal to or higher than 85% and less than 90%
D: Having a residual ratio less than 85%

TABLE 20

|  | (G) Ozone-gas resistance | |
|---|---|---|
|  | Glossy Paper 1 | Glossy Paper 2 |
| Example 11 | A | A |
| Example 12 | A | A |
| Example 13 | A | A |
| Example 14 | A | A |
| Comparative Example 1 | D | D |
| Comparative Example 2 | C | C |
| Comparative Example 3 | A | A |
| Comparative Example 4 | A | A |
| Comparative Example 5 | A | A |

As is obvious from the results of Table 20, it was clearly shown that the inks of the respective Examples had extremely superior ozone-gas resistance as compared with the inks of Comparative Examples 1 and 2. That is, it was obvious that the inks had high residual ratios of the Dk density after the ozone-gas resistance test, and the inks had improved fading properties against ozone gas. Furthermore, it was obvious that the inks provided high-quality recorded images without having the fastness properties markedly degraded depending on the medium.

From the results described above, it is verified that the inks of Examples 11 to 14 of the present invention are highly excellent ink compositions that are superior in all of the following: print density, color saturation, and ozone-gas resistance.

INDUSTRIAL APPLICABILITY

The black ink composition of the present invention is suitably used in black inks for various recording applications such as handwriting instruments, and particularly for inkjet recording.

The invention claimed is:

1. An ink composition comprising at least one kind of coloring matter (I), which is a coloring matter represented by the following formula (1), a tautomer thereof, or a salt of the coloring matter or the tautomer; at least one kind of coloring matter (II), which is a coloring matter represented by the following formula (2), or a salt thereof; and a coloring matter (III), which is a coloring matter having an azo group other than coloring matters (I) and (II), or a salt thereof:

(1)

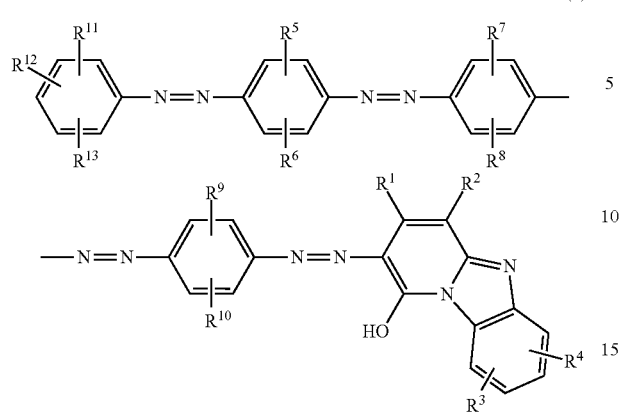

wherein, $R^1$ represents a (C1-C4) alkyl group; a (C1-C4) alkyl group substituted with a carboxy group; a phenyl group; a phenyl group substituted with a sulfo group; or a carboxy group, $R^2$ represents a cyano group; a carbamoyl group; or a carboxy group, $R^3$ and $R^4$ each independently represent a hydrogen atom; a (C1-C4) alkyl group; a halogen atom; a (C1-C4) alkoxy group; or a sulfo group, $R^5$ represents a (C1-C4) alkylthio group; or a (C1-C4) alkylthio group substituted with at least one kind of group selected from the group consisting of a hydroxy group, a sulfo group, and a carboxy group, $R^6$ represents a (C1-C4) alkylcarbonylamino group, $R^7$ represents a (C1-C4) alkylthio group; or a (C1-C4) alkylthio group substituted with at least one kind of group selected from the group consisting of a hydroxy group, a sulfo group, and a carboxy group, $R^8$ represents a (C1-C4) alkylcarbonylamino group, $R^9$ and $R^{10}$ each independently represent a hydrogen atom; a carboxy group; a sulfo group; an acetylamino group; a chlorine atom; a (C1-C4) alkyl group; a (C1-C4) alkoxy group; or a (C1-C4) alkoxy group substituted with at least one kind of group selected from the group consisting of a hydroxy group, a (C1-C4) alkoxy group, a sulfo group, and a carboxy group, and $R^{11}$ to $R^{13}$ each independently represent a hydrogen atom; a carboxy group; a sulfo group; a hydroxy group; an acetylamino group; a chlorine atom; a cyano group; a nitro group; a sulfamoyl group; a (C1-C4) alkyl group; a (C1-C4) alkoxy group; a (C1-C4) alkoxy group substituted with at least one kind of group selected from the group consisting of a hydroxy group, a (C1-C4) alkoxy group, a sulfo group and a carboxy group; a (C1-C4) alkylsulfonyl group; or a (C1-C4) alkylsulfonyl group substituted with at least one kind of group selected from the group consisting of a hydroxy group, a sulfo group, and a carboxy group, (2)

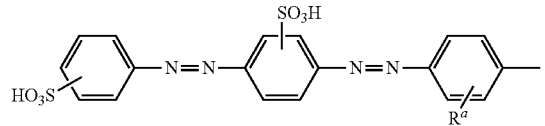

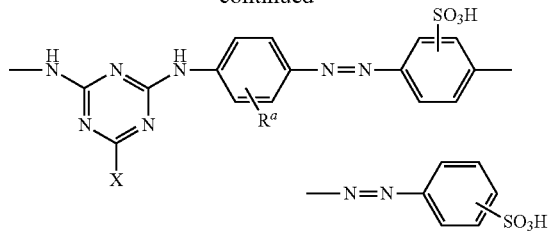

wherein, $R^a$ represents a hydrogen atom; a hydroxy group; a carboxy group; an unsubstituted (C1-C4) alkyl group; a (C1-C4) alkyl group substituted with a hydroxy group or a (C1-C4) alkoxy group; an unsubstituted (C1-C4) alkoxy group; a (C1-C4) alkoxy group substituted with a hydroxy group or a (C1-C4) alkoxy group; an unsubstituted (C1-C4) alkylamino group; a (C1-C4) alkylamino group substituted with a hydroxy group or a (C1-C4) alkoxy group; a carboxy-(C1-C5) alkylamino group; a bis(carboxy-(C1-C5) alkyl)amino group; an unsubstituted (C1-C4) alkanoylamino group; a (C1-C4) alkanoylamino group substituted with a hydroxy group or a (C1-C4) alkoxy group; an unsubstituted phenylamino group; a phenylamino group having the benzene ring substituted with at least one kind of group selected from the group consisting of a carboxy group, a sulfo group, and an amino group; a sulfo group; a halogen atom; or a ureido group, and X represents an aliphatic amino group substituted with a carboxy group or a sulfo group.

2. The ink composition according to claim 1, wherein in the formula (1), $R^1$ represents a methyl group; or a phenyl group;
$R^2$ represents a cyano group; or a carbamoyl group;
$R^3$ represents a hydrogen atom; a methyl group; or a methoxy group;
$R^4$ represents a sulfo group;
$R^5$ represents a (C1-C4) alkylthio group substituted with a sulfo group or a carboxy group;
$R^6$ represents a (C1-C4) alkylcarbonylamino group;
$R^7$ represents a (C1-C4) alkylthio group substituted with a sulfo group or a carboxy group;
$R^8$ represents a (C1-C4) alkylcarbonylamino group;
$R^9$ represents a sulfo-(C1-C4) alkoxy group;
$R^{10}$ represents a (C1-C4) alkyl group; or an acetylamino group; and
$R^{11}$ to $R^{13}$ each independently represent a hydrogen atom; a carboxy group; a sulfo group; a chlorine atom; a nitro group; a methyl group; a methoxy group; a sulfamoyl group; or a (C1-C4) alkylsulfonyl group substituted with a sulfo group or a carboxy group.

3. The ink composition according to claim 1, wherein in the formula (1), $R^1$ represents a methyl group;
$R^2$ represents a cyano group or a carbamoyl group;
$R^3$ represents a hydrogen atom; a methyl group; or a methoxy group;
$R^4$ represents a sulfo group;
$R^5$ represents a sulfo-(C1-C4) alkylthio group;
$R^6$ represents a (C1-C4) alkylcarbonylamino group;
$R^7$ represents a sulfo-(C1-C4) alkylthio group;
$R^8$ represents a (C1-C4) alkylcarbonylamino group;
$R^9$ represents a sulfo-(C1-C4) alkoxy group;
$R^{10}$ represents a (C1-C4) alkyl group; or an acetylamino group; and
$R^{11}$ to $R^{13}$ each independently represent a hydrogen atom; a carboxy group; a sulfo group; a chlorine atom; a nitro group; a methyl group; a methoxy group; or a sulfamoyl group.

4. The ink composition according to claim 1, wherein the coloring matter represented by formula (2) is represented by the following formula (3):

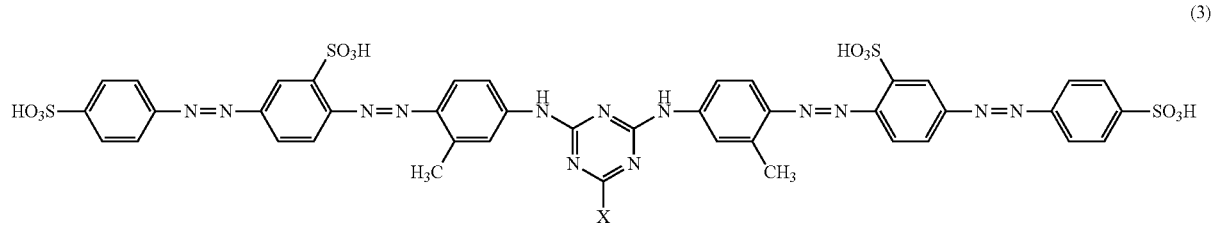

(3)

wherein X has the same meaning as defined in the formula (2).

5. The ink composition according to claim 1, wherein X represents a mono-(C1-C5) alkylamino group or di-(C1-C5) alkylamino group, having a carboxy group or a sulfo group.

6. The ink composition according to claim 1, wherein X represents a sulfoethylamino group.

7. The ink composition according to claim 1, wherein the coloring matter (III) is a water-soluble yellow dye having one or two azo groups in one molecule.

8. The ink composition according to claim 1, wherein relative to the total mass of the coloring matters contained in the ink composition, the ratio of the coloring matter (I) is 50% to 90% by mass, the ratio of the coloring matter (II) is 3% to 30% by mass, and the ratio of the coloring matter (III) is 3% to 30% by mass.

9. The ink composition according to claim 1, wherein the total content of the coloring matter (I), the coloring matter (II), and the coloring matter (III) is 0.1% to 20% by mass relative to the total mass of the ink composition.

10. The ink composition according to claim 1, which is utilizing in inkjet recording.

11. An inkjet recording method comprising: utilizing the ink composition according to claim 1 as an ink; and discharging ink droplets of the ink according to recording signals, thereby performing recording on a record-receiving material.

12. The inkjet recording method according to claim 11, wherein the record-receiving material is a communication sheet.

13. The inkjet recording method according to claim 12, wherein the communication sheet is a sheet comprising an ink-receiving layer containing a porous white inorganic material.

14. A colored body colored with the ink composition according to claim 1.

15. An inkjet printer equipped with a vessel containing the ink composition according to claim 1.

* * * * *